United States Patent
Antony

(10) Patent No.: US 8,682,751 B1
(45) Date of Patent: *Mar. 25, 2014

(54) PRODUCT DIMENSION LEARNING ESTIMATOR

(71) Applicant: Amazon Technologies, Inc., Reno, NV (US)

(72) Inventor: Felix F. Antony, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/828,425

(22) Filed: Mar. 14, 2013

Related U.S. Application Data

(63) Continuation of application No. 11/390,430, filed on Mar. 27, 2006.

(51) Int. Cl.
    *G06Q 10/00* (2012.01)
(52) U.S. Cl.
    USPC .......................................................... 705/28
(58) Field of Classification Search
    None
    See application file for complete search history.

(56) References Cited

U.S. PATENT DOCUMENTS

| | | |
|---|---|---|
| 5,430,831 A | 7/1995 | Snellen |
| 6,138,371 A * | 10/2000 | Lippa et al. .................... 33/562 |
| 6,505,094 B2 * | 1/2003 | Pape et al. ..................... 700/217 |
| 7,085,677 B1 | 8/2006 | Champlin et al. |
| 2003/0200111 A1 | 10/2003 | Damji |

OTHER PUBLICATIONS

Jacopo Cappellato; "[OFBiz] [JIRA] Commented: (OFBIZ-669) Shipping Box Size Calculation for Better Estimates;" Website; JIRA; Jan. 16, 2006 12:36:45; http://lists.ofbiz.org/pipermail/jira/2006-January/002451.html.

Jacopo Cappellato; "[OFBiz] [JIRA] Commented: (OFBIZ-669) Shipping Box Size Calculation for Better Estimates;" Website; JIRA; Jan. 16, 2006 17:56:44; http://lists.ofbiz.org/pipermail/jira/2006-January/002428.html.

* cited by examiner

*Primary Examiner* — Paul Danneman
(74) *Attorney, Agent, or Firm* — Robert C. Kowert; Meyertons, Hood, Kivlin, Kowert & Goetzel, P.C.

(57) ABSTRACT

A computer-implemented method for automatically determining estimated item dimensions may facilitate operations of a materials handling facility when exact dimensions of items are not known. Such a method may involve determining dimensions of a container, portal, or dimensionally constrained path in which an instance of a given item is handled and determining estimated dimensions of the item dependent on dimensions of the container, portal, or path. In some embodiments, the method may include determining dimensions of a second container, portal, or path in which an instance of the item is handled and updating the estimated item dimensions dependent on the dimensions of the second container, portal, or path. In some embodiments, the method may include recommending a container, portal, or path suitable for storing or transporting one or more items dependent on the estimated dimensions. In some embodiments, the estimated dimensions may facilitate identifying items in an inventory area.

20 Claims, 7 Drawing Sheets

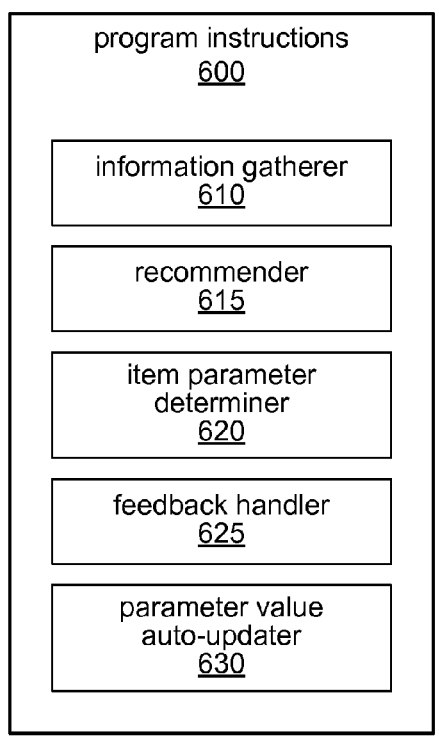
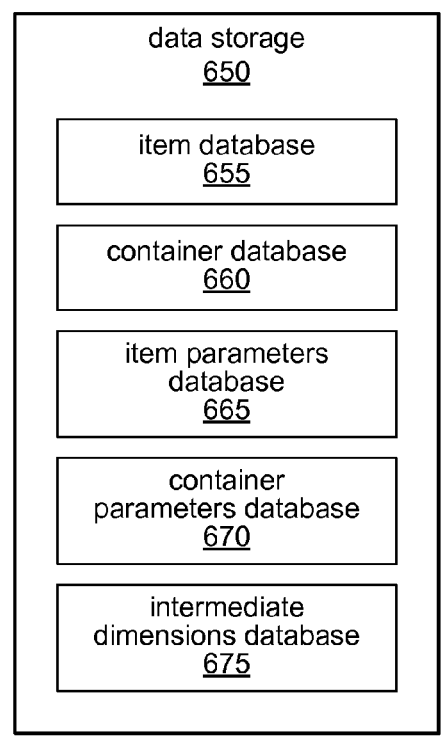
FIG. 6A
FIG. 6B

PRODUCT DIMENSION LEARNING ESTIMATOR

This application is a continuation of U.S. patent application Ser. No. 11/390,430, filed Mar. 27, 2006, which is incorporated by reference herein in its entirety.

BACKGROUND OF THE INVENTION

1. Field of the Invention

This invention relates to materials handling systems and more specifically to estimating dimensions of items and groups of items therein.

2. Description of the Related Art

Many companies package groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by clients or customers. Similarly, manufacturers may maintain an inventory of parts and/or materials for use in manufacturing processes. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling. In order to make better use of inventory stocking space, it may be desirable to stock different items together in a single storage location or stocking area, and to select the storage location or stocking area to maximize space utilization in the materials handling facility. Additionally, groups of items may need to be placed in various containers prior to shipping, such as when picking items for an order and transporting them to a sorting or packing station. Selecting inappropriate containers for storing or conveying the items within the materials handling facility and selecting inappropriate shipping containers may increase costs, in terms of inventory space, container costs, shipping costs, and item damage.

Storage and packaging of groups of items may be made more space-efficient when an appropriately sized storage area or container is selected based on the total dimensions of the group of items. However, the storing or packing agent may not know the dimensions of each of the items in a group. An agent may instead select a storage area or container based on a visual assessment of the items once they are grouped. Using this method, the agent may not be able to select an appropriate storage area or container until all of the items in the group have been collected.

A common concern with such groups of items, referred to herein as "item packages," involves ensuring that appropriate containers are used for handling them, both to minimize costs and to protect the item contents. The visual method described above may be prone to human error, as an agent may select a container that is too small or that is larger than it needs to be. This may result in higher costs associated with using an inappropriate container or in additional costs associated with re-work, in the case that an agent must re-package the items. For example, shipping a group of items in a box that is larger than necessary may result in a higher shipping cost than shipping the same items in a smaller box, due to the cost of the box and/or any higher fees associated with shipping larger or heavier boxes. Similarly, storing items in inventory areas that are larger than necessary, or not filling each inventory area to capacity, may waste valuable (and expensive) warehouse space. In another example, attempting to store an item in a bin that is too small for the item may damage the item. Determining appropriate containers for handling items in a materials handling facility is difficult if the sizes of all of the items are not known.

Ensuring appropriate handling of items is made even more difficult in situations in which a company has a very large number of diverse items that may be included in package contents, when the available items can frequently change (e.g., to add new items that become available, as well as to remove discontinued items or items that are otherwise unavailable), when some or all of the available items are provided by third parties (e.g., third-party sellers), and when the items themselves may change over time (e.g., due to a change in the packaging of a particular item and/or changes in the item itself).

One technique that may be used to determine the total dimensions of a group of items is to determine the actual dimensions of each of the items and to mathematically combine them. Vendors of particular items may provide the dimensions of those items when they are shipped to a materials handling facility or may provide this information in a catalog of their products. Commonly it is necessary to manually measure other items in the materials handling facility as they are received or picked for packing, adding costs and opportunities for human error. Scanning devices, such as a CubiScan™ machine, may be used to measure each item, but these also require labor on the part of an agent, adding costs and further opportunities for error.

Another concern in a materials handling facility involves ensuring that the correct items (according to an order or packing list) are included in the contents of item packages. Such content accuracy is not only very important for customer retention and goodwill purposes, but also for inventory control, tracking purposes, and the costs associated with inaccurate item contents (e.g., handling customer support calls and item returns for packages shipped to customers).

SUMMARY

Properties of dimensionally constrained environments (e.g., containers, portals, etc.) used in handling items in a materials handling facility may be associated with the items and these properties may be used to determine corresponding properties of the items themselves. Specifically, a computer-implemented method for automatically determining estimated item dimensions dependent on dimensions of containers (or portals, etc.) used in handling items is described. Determining estimated item dimensions using such a method may, in some embodiments, facilitate various operations of a materials handling facility when exact dimensions of items are not known. In some embodiments, the method may include determining the dimensions of a container, portal, or dimensionally constrained path in which an instance of a given item is handled and determining estimated dimensions of the item dependent on the dimensions of the container, portal, or path. The method may also include determining dimensions of additional containers, portals, or paths in which an instance of the item is handled and updating the estimated item dimensions dependent on the dimensions of these additional containers, portals, or paths. In this way, a product dimension learning estimation system employing the method described herein may continuously refine estimated dimensions of an item as one or more instances of the item are handled in the facility.

In one example, if an item is received at the facility, either alone or packaged with other items, through a particular doorway of a loading dock, one or more dimensions of the item may be assumed to be smaller than the dimensions of the doorway opening. If the item, with or without other items, is then transported within the facility on a pallet, the dimensions of the item may be further assumed to be smaller than corresponding dimensions of the pallet. If the item is later stored in a particular bin or transported in a specific tote, with or without other items, the dimensions of the bin or tote may be used to further refine the estimated dimensions of the item. Finally, as the item is packaged, alone or with other items, for shipping, the dimensions of the container used for shipping may also be used to refine the estimated dimensions of the item. As additional instances of the item are received, transported, stored, or packed for shipping in the facility, the product dimension learning estimator may continuously iterate to refine the estimated dimensions of the item. In some embodiments, an initial estimate of item dimensions may correspond to a given size envelope and additional estimates may be used to reduce this envelope as more information is associated with the item during handling in the facility. The exact dimensions of some items may never be determined, in some embodiments, although reasonable estimates may be used as the "practical dimensions" of these items in order to facilitate efficient operation of the facility.

A product dimension learning estimator may, in some embodiments, be used to recommend a container, portal, or path suitable for storing or transporting one or more items dependent on their estimated dimensions. For example, in some embodiments, the estimator may receive information identifying two or more items to be placed in a container, may retrieve one or more estimated dimensions of each of the items, and may recommend a container into which the items may be placed dependent on the estimated dimensions. In one embodiment, recommending a container into which the items may be placed may involve selecting the smallest available container into which the items will fit from among a plurality of available containers. In another embodiment, recommending a container into which the items may be placed may involve estimating the total dimensions of the group of items dependent on the estimated dimensions of each of the items and selecting a container having dimensions greater than or equal to the estimated total dimensions. In yet another embodiment, the estimator may determine if an item or group of items may be passed through a particular portal or conveyed using a particular path. In many cases, knowing the exact dimensions of an item may not be necessary for determining a container into which a group of items can be placed, since the "practical dimensions" of the items may provide a size envelope accurate enough to select a container from among a finite set of container types and sizes.

A product dimension learning estimator may also be used to select a container in which to store or transport an item based on the amount of room remaining in the container, in some embodiments. For example, when an item is received and needs to be stored in inventory, the estimator may determine that a particular bin has sufficient space to contain the item, based on stored estimated dimensions of the item, stored dimensions of the bin, and stored estimated dimensions of any other items already located in the bin. Similarly, if an item is to be "picked" from inventory, the estimator may direct a particular agent to pick the item based on the size tote the agent is carrying, the stored estimated dimensions of the item, and the stored estimated dimensions of any other items already picked and placed in the agent's tote. In another example, an agent may be directed to store an item in a particular section of a warehouse having larger than average bins or shelves, based on estimated dimensions of the item. Again, knowing the exact dimensions of the item may not be necessary in some embodiments, since the item will fit into any container having remaining space greater than or equal to the size envelope corresponding to the "practical dimensions" of the item.

A product dimension learning estimator may receive feedback indicating if the items were placed in a recommended container, or handled using a recommended portal or path, in some embodiments. In one embodiment, the estimator may receive an indication of why the items were not placed in the recommended container if the feedback indicates that the items were not handled using in the recommended container, portal, or path. In one such embodiment, at least one of the estimated dimensions of at least one of the items may be updated if the container, portal, or path was too small to handle the items. In one embodiment, at least one of the estimated dimensions of at least one of the items may be updated if the items fit in a container, portal, or path smaller than a recommended one. In various embodiments, the estimator may use such feedback in determining that dimension values supplied by a vendor are inaccurate, that an item may have changed shape or size, or that an item package does not contain the correct items.

A product dimension learning estimator may also use estimated item dimensions to facilitate item identification for a picking operation, in some embodiments. For example, an agent may be directed to pick the "tallest" or "thinnest" item from among those in an inventory area, based on the estimated dimensions of each of the items known to be stored in that area. As shown in this example, exact item dimensions may not be necessary to facilitate picking, in such embodiments, as estimated item dimensions may be accurate enough to distinguish the items using relative dimension comparisons.

BRIEF DESCRIPTION OF THE DRAWINGS

FIGS. 6A and 6B illustrate, respectively, components of program instructions and data storage suitable for implementation of an automated product dimension learning estimator, according to one embodiment.

Figure 1:
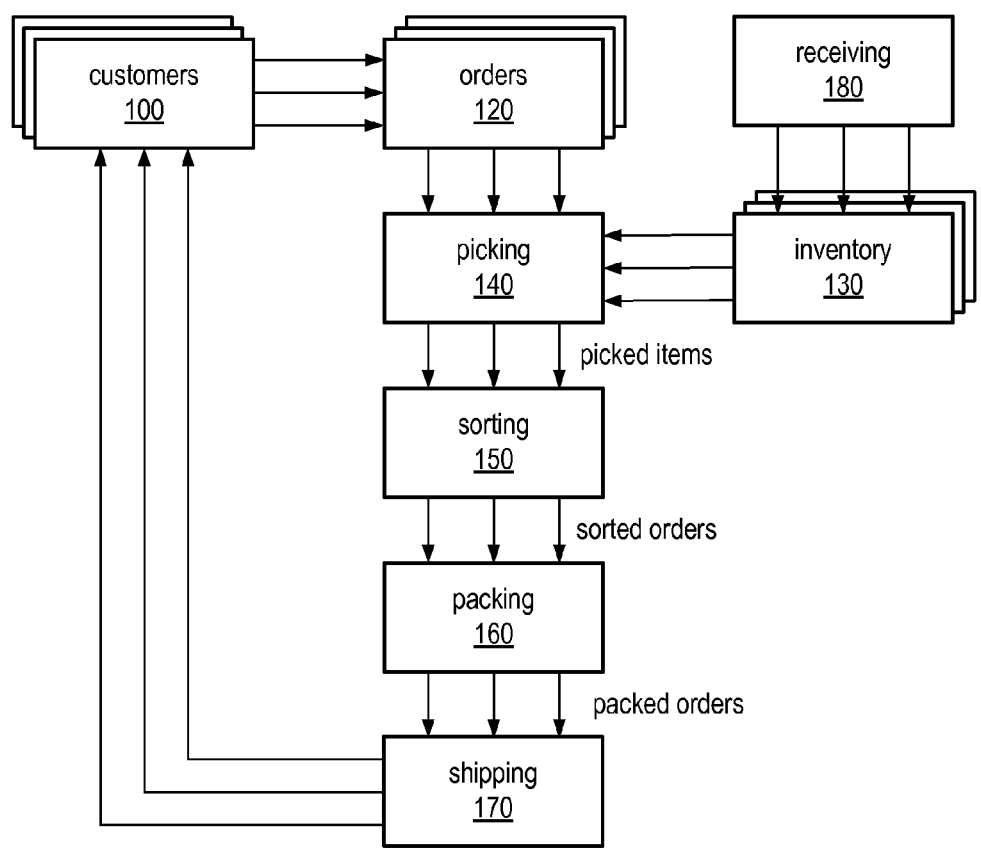
FIG. 1 illustrates a broad view of the operation of an order fulfillment facility, in one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Introduction

A method and system are described below for automatically estimating product dimensions and dimensions of containers suitable for storing or conveying groups of products. In some embodiments, such a method may be used to optimize space utilization for various operations of a materials handling facility. In some embodiments, such a method may be used to optimize selection of an appropriate container in which to store, convey, or ship an item or group of items. In various embodiments, such a method may also facilitate picking items from inventory. The system may operate in environments in which the items that are available frequently change and/or in which available items themselves can change, with the system automatically adapting to such changes, in various embodiments.

In particular, in some embodiments, automated product dimension estimation may include automatically estimating values for one or more parameters (e.g., dimensions) of available items based on corresponding dimensions of various containers in which one or more of the items are stored or conveyed, or portals through which they are passed, in a materials handling facility. Furthermore, in some embodiments, after initial estimation, the values for item parameters may continue to be estimated and refined as the items are included in other item packages. More appropriate values for item parameters may be learned based on these subsequent estimates. As used herein, "item packages" may refer to items grouped for shipping to a customer or items grouped for any other operation within a materials handling facility, such as for storing in inventory or transporting to a packing or shipping station. In various embodiments, "containers" may include pallets, crates, cases, bins, boxes, carts, totes, conveyor belts, shelves, cabinets, or any other apparatus capable of storing, conveying or shipping one or more items. In some embodiments, item dimension estimation may be determined based in part on one or more dimensions of a portal through which one or more items passes in the materials handling facility, such as a doorway, window, hatch, aperture, gate, or similar opening. In other embodiments, item dimension estimation may be based in part on one or more dimensions of any dimensionally-constrained path an item may take in the facility, such as in or on a track, chute, ramp, channel, pipe, tube, or the like. In various embodiments, item dimension estimation may be based in part on any dimensionally-constrained environment, including a container or dimensionally-constrained portal or path as described herein, in which one or more items may be handled in the facility.

After automatically identifying item parameter values, the product dimension learning estimator may use those values to estimate corresponding parameter values (e.g., dimensions) of various containers, portals, or paths suitable for storing or conveying one or more items in the materials handling facility or for shipping one or more items. In some embodiments, an automatic product dimension estimator may be configured to recommend a container, portal, or path suitable for storing or conveying one or more items in the materials handling facility or for shipping one or more items, such as in response to a customer order. For example, the estimator may recommend a particular box type and/or size suitable for shipping a group of items associated with a customer order based on the estimated dimensions of each of the items in the group and the dimensions of the boxes available for shipping. In another example, the estimator may recommend a particular shelf on which to store a book based on the estimated dimensions of the book, the dimensions of one or more available shelves, and the estimated dimensions of any other items already located on the available shelves.

In some embodiments, an automated product dimension learning estimator may also be used to identify incongruous item packages whose dimensions do not correspond to the estimated values for those dimensions. For example, if a group of items fit in a container significantly smaller than a container recommended by the estimator, this may indicate that one or more items intended to be included in the container is not present. In such cases, the estimator may recommend a manual review of the contents of the container. The results of such a manual review may then be automatically incorporated by the estimator in an appropriate manner, such as to update learned item dimension values to reflect container dimension values when no problems with the container's contents are identified and/or to reflect one or more actual dimension values from the review (e.g., by replacing an estimated value with an actual value, by adjusting a range of allowable values for that dimension of that item, by adjusting the uncertainty associated with the learned item dimension value, etc.).

Similarly, the product dimension learning estimator may also be used to detect that the item dimensions supplied by a vendor are inaccurate or that the size or shape of an item has changed, in some embodiments. For example, if one or more items fit best in a container different than a recommended container, this may indicate that the stored estimated dimensions of the item are incorrect. In some cases, this may be because not enough information has been gathered for one or more of the items in the group to converge on a reasonable estimate of its dimensions. In other cases, this may indicate that the default value for one or more dimensions of one or more of the items, such as a value supplier by a vendor, was significantly different than the actual dimension of the item. In still other cases, this may indicate that the actual dimensions of one or more of the items has changed, such as if one of the items has been packaged differently by the vendor or the dimensions of the item itself have changed. In some embodiments, a manual review of these item packages may be used to determine the cause of the inaccuracy, while in other embodiments, the estimator may continue to gather information about the items in order to determine if the inaccuracy is due to a change or a poor input, or if it is a statistical outlier (e.g., a single instance of a defective item or item identifier.)

A product dimension learning estimator may in some embodiments be used to facilitate the picking operation of a materials handling facility. For example, an agent may be directed to select a given item from a particular inventory area that is "fat", "tall", "shortest", "thinnest", or "shallow", based on the relative estimated dimensions of the given item and the other items in the inventory area.

In one example, an automated product dimension learning estimator may be used as part of a distribution operation for an organization that ships large numbers of item packages to customers. In this example, the organization may maintain information about each of the items that is available to be shipped, but that item information may not include verified dimensions of the items. In some embodiments, the product dimension learning estimator may automatically learn the practical dimensions of the items by comparing dimensions of containers, portals, or paths used in handling overlapping item contents. When the estimator has sufficient dimension information for the items intended to be the contents of an item package, the estimator may then anticipate the total dimensions of the package container (e.g., an exterior box) based on those item dimensions and on the dimensions of any non-item contents of the package (e.g., a promotional insert from the organization).

In some embodiments, the dimensions and/or volume of items may be automatically learned based on corresponding values for containers, portals, and paths used in handling those items, and those learned item parameter values may subsequently be used to identify other containers, portals, or paths whose volume and/or dimensions are appropriate for handling those items. In addition, in some embodiments the dimensions and/or volume of the packaging materials and any other non-item contents may also be automatically learned, while in other embodiments these parameter values may instead be supplied to the facility as an input. In one embodiment, the volume of an item may be defined to be equal to the volume of a three-dimensional bounding box having length, width, and height equal to the length, width, and height of the item, and the volume of a container may be defined to be the maximum volume of the interior of the container. In some embodiments, the volume and dimensions of a group of items may be defined, respectively, to be the volume and corresponding dimensions of a three-dimensional bounding box having sufficient length, width, and height to contain all of the items in the group at the same time. While the examples contained herein use these definitions, other embodiments may use other definitions of volume or may not use volume determination as part of product dimension estimation.

In some embodiments, the automated product dimension learning estimator may perform an initial learning phase in which item dimension values are learned to a particular degree of accuracy, and may then enter an active phase in which these estimated dimensions may be used to recommend containers or paths for storing, conveying or shipping groups of items, or to determine if an item or group of items can pass through a particular portal or be conveyed using a particular dimensionally-constrained path. While this initial phase may in some embodiments be of sufficient length to learn the practical dimension values for all of the available items, in other embodiments the estimator may instead begin to recommend containers, portals, or paths as soon as it has sufficient data for the items intended for inclusion in a corresponding item package. The determination of when sufficient data for an item dimension value has been reached may be performed in various ways in various embodiments. Example criteria for such a determination may include having a single estimate for a dimension value, having a specified minimum number of estimates, having sufficient estimates to reach a specified statistical level of uncertainty or confidence, etc.

The system may in some embodiments continue to estimate item dimension values on an ongoing basis even after an initial learning phase, thus allowing additional item dimension value estimations to refine previously estimated values (e.g., by adjusting the value, by reducing uncertainty as to the actual value, by identifying outliers to be ignored, etc.). This process may be performed in a variety of ways in various embodiments, and may include discounting or ignoring older estimated dimension values for an item in favor of more recent values, looking for patterns in the dimension values for an item to identify consistent changes or a trend over time to allow a better estimation of future values, etc. Such ongoing analysis may, in some embodiments, permit the system to dynamically learn dimension values for new items that are added, as well as to identify changes to individual items (e.g., due to a change in materials used for the item or packaging of the item). In addition, some item dimensions may have values that vary in different manners according to a statistical distribution such as, e.g., a standard bell curve, a step function, a multi-modal distribution with two or more distinct allowable value groupings, etc. If so, some embodiments of the system may incorporate such details of distribution when recommending containers, portals, or paths for handling groups of items including those items.

In some embodiments, the estimator may consider additional factors when estimating dimension values. For example, values for dimensions may vary for at least some items and packaging materials based on factors such as current temperature, humidity, altitude, etc. In addition, when a particular item or type of packaging material may be supplied from multiple suppliers, estimated values for parameters for those items may be adjusted as appropriate based on the supplier if variations based on the supplier occur. More generally, a variety of techniques may be employed to track a variety of environmental and other relevant factors corresponding to items and packaging materials in order to determine which of the factors has a possible causal or correlative effect on the values of the parameters, and estimated values for those parameters may then be adjusted to reflect those factors, such as automatically and in a real-time manner, according to various embodiments.

In some embodiments, feedback may be used to improve the automated product dimension learning estimation process. This feedback may be the result of a manual review, as described above, or as the result of automated feedback from various operations of the materials handling facility. For example, if items and containers are scanned when the items are placed in a container for storage, transport, or shipping, the estimator may detect that a recommended container was not used or that the items were placed in a container smaller than anticipated based on estimated dimensions of its contents. In some embodiments, the estimator may automatically incorporate this information in calculating new estimates for one or more dimensions of one or more of the items in the container or may update a confidence level for one or more estimated dimensions. In some embodiments, an agent of the materials handling facility, such as a picking, sorting or packing agent, may detect that a container recommended by the automatic product dimension learning estimator is not appropriate for the group of items intended to be placed in it. In another example, if an item or group of items is determined to be able to pass through a particular portal or fit through a particular chute based on estimated dimensions, but the item or items do not fit, an agent or an automated operation may provide feedback to the estimator that one or more of the estimated dimensions may be inaccurate. In some embodiments, if a recommended container, portal, or path is inappropriate, an agent may select a more suitable container, portal, or path for the items.

An agent may provide feedback to the estimator indicating that a recommended container, portal, or path was not used, in some embodiments. In some embodiments, the agent may provide feedback to the estimator indicating one or more reasons why the recommended container, portal, or path was not used, such as that it was smaller or larger than necessary, or that none of the recommended containers was available. The estimator may, in some embodiments, incorporate this additional information when updating a value or confidence level for one or more dimensions of one or more of the items in the container. The agent may provide feedback to the estimator in a variety of ways that may include, but are not limited to, scanning a container used, entering container, portal, or path information through a terminal or other input/output device serving to input data to the estimator, or pressing one or more buttons, keys, levers, or touch pads to indicate whether or not the recommended container, portal, or path was used and/or the reason, if it was not. In some embodiments, an agent may provide feedback to the estimator indicating that one or more of the items in a container is not completely contained within the container, such as if a tall item sticks out of the top of a bin or a wide item overhangs the edge of a conveyor belt. In such cases, the automated product dimension learning estimator may use a variation of its standard algorithm to calculate estimated dimensions for the item or may require more data in order to determine the dimensions of the item.

In some embodiments, any feedback to the automated product dimension learning estimator may be incorporated in a real-time or near real-time manner, such as to enable estimates of overall item group dimensions or recommendations of containers, portals, or paths for groups of items containing overlapping contents to use updated dimension values and/or updated confidence levels. In some embodiments, if feedback is received about a particular item, the estimator may automatically recommend a manual review for any item packages that are currently in the facility that include that item, may indicate that preparation of any item packages that are to include the item should be postponed, may reduce any allowable variance with respect to that item so as to maximize the likelihood of identifying other packages that include copies of the item that have a problem, or may take other action to prevent problems concerning the storage, transport or shipping of groups of items containing the item.

In some embodiments, an external party (e.g., a supplier or manufacturer of an item) may provide some parameter value information for items, such as one or more dimension values. In some embodiments, such third-party information may be used as an initial default value for the dimension(s) that may then be adjusted by the product dimension learning estimator, while in other embodiments such information may instead be treated in other manners (e.g., ignored, given a discounted value with respect to estimated values, given a more highly weighted value with respect to estimated values, etc.).

For illustrative purposes, some embodiments of automated product dimension estimation are discussed below in which particular item and container parameters are analyzed in particular manners, and in which particular types of analysis and processing of parameters is performed. However, those skilled in the art will appreciate that the techniques described may be used in a wide variety of other situations, and that the invention is not limited to the details of these example embodiments.

Product Dimension Estimation

An exemplary view of a materials handling facility, which, in one embodiment, may be an order fulfillment facility configured to utilize automated product dimension learning estimation as described herein, is illustrated in FIG. 1. In this example, multiple customers 100 may submit orders 120 to the distributor, where each order 120 specifies one or more items from inventory 130 to be shipped to the customer or to another entity specified in the order. An order fulfillment facility typically includes a receiving operation 180 for receiving shipments of stock from various vendors and storing the received stock in inventory 130. To fulfill the customer orders 120, the one or more items specified in each order may be retrieved or "picked" from inventory 130 (which may also be referred to as stock storage) in the order fulfillment facility, as indicated by block 140. Picked items may be delivered to one or more stations in the order fulfillment facility for sorting 150 into their respective orders, packing 160, and finally shipping 170 to the customers 100. Please note that not every fulfillment facility may include both sorting and packing stations. In certain embodiments agents may transfer picked items directly to a packing station, such as packing station 160, while in other embodiments, agents may transfer picked items to a combination sorting and packing station (not illustrated). This may result in a stream and/or batches of picked items for multiple incomplete or complete orders being delivered to sorting 150 for sorting into their respective orders for packing 160 and shipping 170, according to one embodiment. Note that portions of an order may be received at different times, so sorting 150 and packing 160 may have to wait for one or more items for some orders to be delivered to the sorting station(s) before completion of processing of the orders. Note that a picked, packed and shipped order does not necessarily include all of the items ordered by the customer; a shipped order may include only a subset of the ordered items available to ship at one time from one inventory-storing location. Also note that the various operations of an order fulfillment facility may be located in one building or facility, or alternatively may be spread or subdivided across two or more buildings or facilities. In various embodiments, items and groups of items may be transported between the stations or operations of the facility in one or more containers, through one or more portals, and/or using one or more dimensionally-constrained paths, as described herein.

Automated product dimension learning estimation, as described herein in various embodiments, may be utilized in several areas of a materials handling or order fulfillment facility such as during receiving 180, storing in inventory 130, picking 140, sorting 150, packing 160, or shipping 170. For example, if an item is received, at 180, in a particular container, such as a box, case, crate or pallet, the volume and dimensions of the item may be estimated to be less than the corresponding volume and dimensions of the container. Similarly, if the item is stored in inventory 130, its volume and dimensions may be estimated to be less than the corresponding volume and dimensions of the shelf, bin, crate, box, or other container in which it is stored. If an item is transported within the facility during picking 140, such as in a tote or on a cart, its volume and dimensions may be estimated to be less than the corresponding dimensions of the tote or cart, unless it is not completely contained within the tote or cart. Similarly, if the item is transported through a portal or chute, or on a conveyor belt or track, one or more of the item's dimensions may be estimated to be less than one or more dimensions of the portal, chute, belt, or track. The dimensions of any containers, portals, or paths with which the item is handled during sorting 150, packing 160, or shipping 170, may also be used to estimate the volume and dimensions of the item, and may serve to narrow the estimated range for each dimension of an item whenever the item is handled using a container, portal, or path with a corresponding volume or dimension smaller than a previously estimated value, in some embodiments.

In some embodiments, information about containers, portals, or paths used in handling one or more items during the operations described above may be automatically captured as a by-product of normal operation. For example, an automated product dimension learning estimator may receive or capture an identifier of such a container when an agent places an item in the container or removes an item from the container, according to various embodiments. Similarly, a product dimension learning estimator may automatically receive or capture an identifier of an item when it is placed in or removed from a container, passed through a portal, or put on or taken off of a dimensionally-constrained path, in some embodiments. For example, a bar code or Radio Frequency Identification tag (RFID tag) of a container and/or an item may be automatically scanned and the data from the scanner may be automatically stored in one or more tables or databases accessible by the estimator when the item is placed in the container. In another example, an item may be scanned when it passes through a portal, such as a doorway between two rooms or buildings, or when it is placed in a chute. In some embodiments, items and corresponding containers, portals, or paths may be scanned as part of normal operations when an item is stored, picked, transported, or sorted, or when they are placed in a container for shipping. Therefore, in some embodiments, no additional steps may need to be performed to capture identifiers of the items and the containers, portals, or paths used in handling them in the facility. In some embodiments, these identifiers may be associated with one or more entries in tables or databases containing known and/or estimated values for the dimensions of various containers, portals, paths, and items.

A system configured to implement automated product dimension learning estimation may, in some embodiments, also be configured to instruct or recommend the selection, from among available containers, of a container in which to place one or more items, or a portal or path through which to convey the items, during the receiving 180, storing in inventory 130, picking 140, sorting 150, packing 160, or shipping 170 operations described above. In some embodiments, the selection of containers that are neither too small nor larger than they need to be may result in more efficient use of space in the facility for storage and other operations, and may also reduce costs associated with floor space, packing materials, or transportation (e.g., shipping). In some embodiments, the estimator may be used in an initial learning phase to estimate the dimensions of various items to be placed in a container, while during an active phase, these learned dimensions may be used to estimate corresponding dimensions of a container suitable for storing, transporting, or shipping the items that is space-efficient and/or cost effective. In some embodiments, an estimator operating in an active phase may be used to determine if an item or group of items will fit in a given inventory area, will fit through a given portal, such as a doorway, hatch, or gate, or can be transported using a given dimensionally-constrained path, such as a chute, track, pipe, or conveyor belt. In other embodiments, an estimator operating in an active phase may be used to facilitate item picking, such as by directing an agent to select a given item from a particular inventory area based on the relative values of stored, estimated dimensions of the items in the inventory area.

Automated product dimension learning estimation, as described herein in various embodiments, may be utilized in a number of different facilities and situations, including, but not limited to material handling facilities, order fulfillment centers, rental centers, distribution centers, packaging facilities, shipping facilities, libraries, museums, warehouse storage facilities, and the like. Please note that the arrangement and order of operations illustrated by FIG. 1 is merely one example of many possible embodiments of the operation of an order fulfillment facility utilizing automated product dimension learning estimation. Other types of materials handling, manufacturing, or order fulfillment facilities may include different, fewer, or additional operations and resources, according to different embodiments.

In some embodiments, a materials handling facility may store different instances of items in different individual inventory areas within inventory 130. Additionally, different items may be stored together in a single inventory area, according to certain embodiments. In some cases, storing different items together may result in more efficient use of total inventory space than using a single inventory area for multiple copies of a single item or product. In other cases it may be beneficial to store similar items together to make better use of inventory space. In some embodiments, such as that illustrated in FIG. 2, an inventory area may include both similar items stored together, such as on one shelf, and different items stored together, such as on another shelf. In this example, storing different compact discs (CDs) together on a single inventory shelf, as shown in inventory area 235b, may use the available inventory space more efficiently than storing one CD among other items of greatly differing size and shape, such electronic devices, clothing, or other items. In some embodiments, a materials handling facility may also store items of similar, but not identical, shape and size together in a single inventory area. For instance, in one embodiment, items such as books, CDs, and digital video discs (DVDs) may all be stored together, as shown in inventory area 235a. In still other embodiments, different items, with different shapes and sizes, may all be stored together. For example, inventory area 235e illustrates clothing and electronic items stored along with books, CDs, etc.

In some embodiments, determining where to store an item may be performed manually, while in other embodiments, it may be an automatic process performed by one or more computer software programs based on the dimensions of the items, such as those learned by an automated product dimension learning estimator. In some embodiments, both space utilization and speed of storing may be improved if an agent is directed to store an item in an inventory area, such as a shelf or bin, in which it will easily fit. In some such embodiments, selecting an appropriate inventory area may also reduce damage during the storing operation if items are not forced into shelves or bins that are too small. In some such embodiments, the estimator may use the estimated dimensions of an item that needs to be stored, the estimated dimensions of currently stored items, and the dimensions of inventory areas in which items are currently stored to identify an inventory area with enough remaining free space to hold the item. For example, if a book is to be stored in one of the inventory areas illustrated in FIG. 2, the estimator may use the estimated dimensions of the book to determine that it is too wide to fit in any remaining spaces of inventory areas 235a, 235b, 235c and 235e, based on the estimated dimensions of the other items stored in those areas. In this example, the estimator may determine that the book will easily fit in inventory area 235d and may direct an agent to store it in this area.

Similarly, for operations other than storing, selecting an appropriate container in which to place one or more items may also increase space utilization and/or reduce damage and costs. For example, selecting an appropriate portal or dimensionally-constrained path through which to convey an item may reduce damage caused by trying to fit an item through a portal that is too small or by trying to place an item in a chute that is too narrow for the item. In another example, being able to estimate the size of totes needed for picking groups of items and being able to pack these totes to near capacity, based on the estimated dimensions of the items in the group, may reduce the number of such totes needed, thereby reducing costs.

Figure 2:
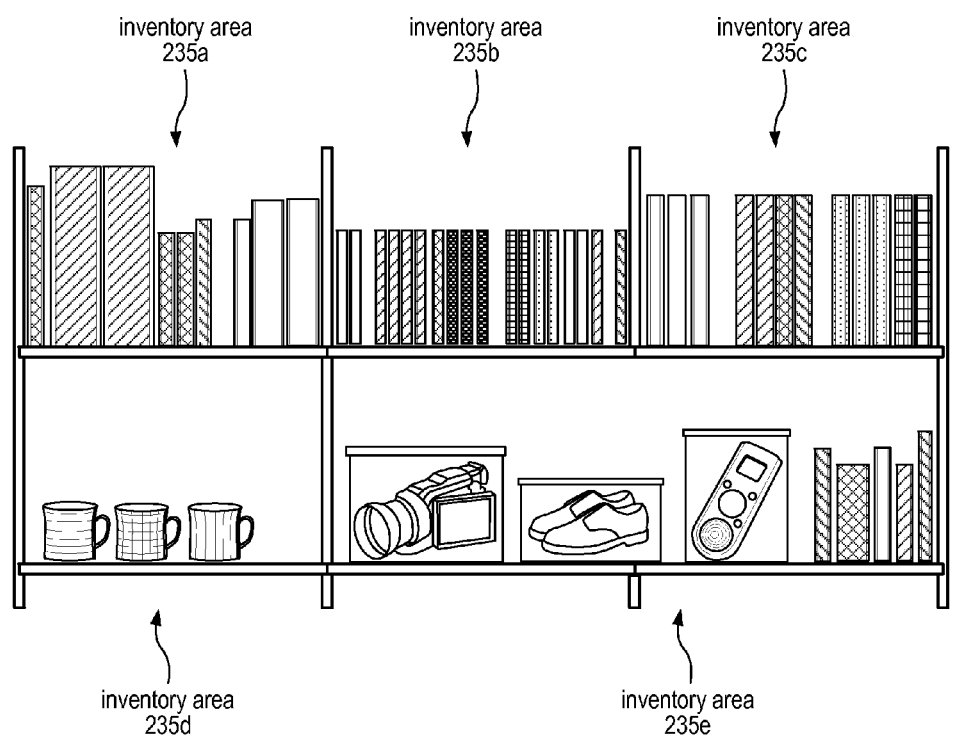
FIG. 2 illustrates various items stored in a multi-shelf inventory area, according to one embodiment.

The items in a materials handling facility may be of varying shapes and sizes, as shown in the exemplary inventory areas illustrated in FIG. 2. In this example, some items in the materials handling facility are irregularly shaped. In some embodiments, irregularly shaped items may be stored in boxes or other regularly shaped packaging, which may facilitate both product dimension estimation and more efficient storage, such as by making stacking of such items possible. This is illustrated in inventory area 235e. In other embodiments, irregularly shaped items may be stored without placing them in regularly shaped packaging. This is illustrated in inventory area 235d. According to various embodiments, automated product dimension learning estimation may be utilized with any regularly shaped or irregularly shaped items.

As previously noted, a product dimension learning estimator may be used to facilitate item identification for picking, in some embodiments. In such embodiments, the estimator may be used to determine, and/or communicate to an agent, a size, shape, or relative size or shape of an item to be picked. For example, in one embodiment, an agent may be directed to select an item from a particular inventory area that is approximately 10 inches tall or 3 inches wide, based on an estimated height or width dimension for the item. In another embodiment, an agent may be directed to select the "shortest" item or the "thinnest" item in a particular inventory area, based on the relative values of the estimated dimensions for the items in the area. In an example illustrated by FIG. 2, an agent may be directed to select the tallest or widest item in inventory area 235a, either of which would clearly indicate one of two identical items in the area. In some embodiments, the relative shape or size of an item may be combined with other information when directing an agent to identify the item, such as the type or color of the item. For example, an agent may be directed to select the "widest book", the "tall, red book", or the "short, blue box" in inventory area 235e.

Figure 3:
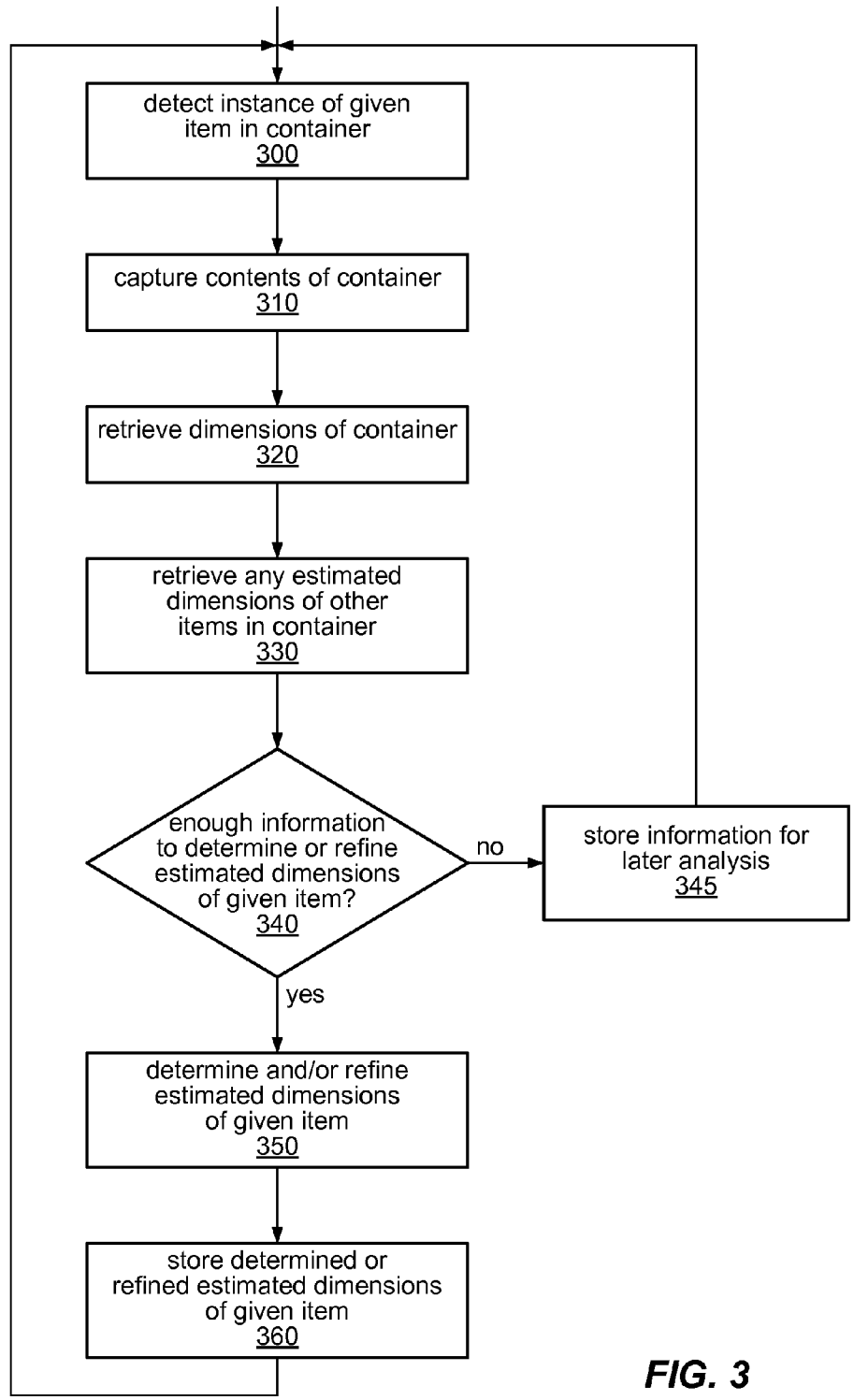
FIG. 3 illustrates a method for determining item dimensions, according to one embodiment.

In some embodiments, automatically estimating product dimensions may involve capturing corresponding dimensions of containers, portals, or paths used in storing or conveying items in a materials handling facility. FIG. 3 illustrates one such embodiment of a method of estimating product dimensions and refining these estimates in an iterative manner. In this example, a system configured to implement automated product dimension learning estimation may detect that an instance of a given item, for which dimensions are to be estimated, has been placed into a container, as illustrated at 300. This container may be one of the containers described above for storing, conveying or shipping the item by itself, or along with other items, according to various embodiments.

In one embodiment, the contents of the container into which the given item was placed may be captured, as in 310, such as by scanning a bar code, RFID tag, or other identifier of each item as it is placed in the container during any of the operations of the materials handling facility. In other embodiments, the contents of the container may be captured when items are removed from the container, such as when they are transferred from picking to sorting, packing, or shipping operations or between any operations in the facility. In some embodiments, an identifier of the container itself may also be captured at 310. The identifiers of the contents of the container may be stored along with an identifier of the container, such as in a table or database, in some embodiments. One such table, Table 3, is described later. In some embodiments, information related to a container may be automatically determined in various ways, such as by automatically scanning a bar code, an RFID tag, or other identifier on the exterior of the container to identify the type of container or by scanning a bar code or other information on a packing slip or shipping invoice that may be mapped to the various intended contents of the package.

In some embodiments, the product dimension learning estimator may retrieve the dimensions of the container, as shown in 320. The dimensions of the container may be retrieved from a table or database containing information about containers available in the facility for various operations, such as Table 3, described below. In one embodiment, the dimensions may be associated with an identifier of the container in the table or database. In another embodiment, container dimensions may be input by an agent working in the facility, such as by entering them at a terminal or using another input/output device.

When determining estimated dimensions for the given item in the container, an automated product dimension learning estimator may, in some embodiments, take into account the presence of other items in the container. In some embodiments, before attempting to estimate the dimensions of the given item, any known dimensions of any other items in the container may be retrieved, as shown in 330. These dimensions may have been supplied by a manufacturer, vendor, distributor, or other supplier of the item or may have been previously determined by the automated product dimension estimator, in different embodiments. In some embodiments, the known dimensions of any other items, whether actual or estimated, may be retrieved from a table or database, such as Table 1A or Table 1B, described below.

In some embodiments, after capturing the contents and dimensions of the container, and any known dimensions of other items in the container, the automated product dimension estimator may or may not have enough information to determine estimated dimensions or to refine previously estimated dimensions for the given item, as shown at 340. For example, if there are other (different) items in the container, but none of the other items in the container has known dimensions, the estimator may be configured to defer estimation of the given item's dimensions until one or more dimensions of one or more of the other items is known. In this way, the estimator may defer estimation until more data is available for calculating estimated dimensions of the given item, such as by solving several simultaneous equations describing the dimensions of the items in the container. In other embodiments, the estimator may be configured to determine estimated dimensions of the given item based on the information at hand, no matter how little information is available.

If there is not enough information to determine or refine the dimensions of the given item, as shown in 345, intermediate data may be stored for later use, in one embodiment. This intermediate data may include data reflecting the contents of the container and the dimensions of the container, in one embodiment. In other embodiments, other intermediate information may be stored, such as the identifiers for the container or its contents, the known dimensions of any other items in the container, the date on which the intermediate data was captured, an instance, batch, or package identifier, or any other information about the container or its contents as may be stored for other uses. This information may be combined with additional information about the given item and any other containers in which it is handled at a later time, in some embodiments. In one embodiment, intermediate data may be stored in a table or a database, such as in Table 4, described below. Once any information gathered by the estimator is stored, the estimator may be configured to repeat steps 300-340 until new information is available for determining or refining estimated dimensions of the given item, as shown in FIG. 3.

If there is enough information available, the automated product dimension estimator may proceed with estimating the dimensions of the given item or refining a previous estimate of the dimensions of the given item according to various algorithms, as shown in 350. For example, if there is only one item in the container, the product dimension estimator may attribute the dimensions of the container to that item. If there are two or more items in the container, the estimator may use any known dimensions of one or more of the items in determining dimensions for one or more other items, in some embodiments.

In some embodiments, the product dimension learning estimator may make particular assumptions about item dimensions or may assign item dimensions according to a standard algorithm, or company policy, in order to facilitate determination of item dimensions from the corresponding dimensions of various containers. For example, in one embodiment, the item dimension having the largest value may be designated to be the "length", the dimension having the second largest value may be designated to be the "height", and the dimension having the smallest value may be designated to be the "width" of the item. In such embodiments, the dimensions of containers may also be designated using the same assumptions. In other embodiments, different assumptions or assignments may be made or the designation of length, height, and width dimensions of items or containers may be arbitrary. In some embodiments, standards or policies may specify other aspects of item dimension estimation, such as a default placement or orientation for certain items within containers or a specific bin-packing algorithm to be assumed when determining item dimensions. For example, a policy may specify that all books are to be stored vertically on shelves within the facility or that the largest item in a group should be placed horizontally along the bottom of shipping boxes.

In some embodiments, the length of each item in the container may be estimated by assigning it the value of the longest dimension of the container. Similarly, the height of each item in the container may be estimated to be equal to the second longest dimension of the container. In such embodiments, the product dimension learning estimator may be configured to calculate the width of the item, such as if an actual or estimated volume is known, or it may be configured to postpone estimating the width of the item until more information is available, such as from subsequent item packages.

In some embodiments, a volume may be estimated for each of the items in the container, whether or not there is enough information to determine the dimensions of the items. In some embodiments, the volume of the container may be calculated and used in the determination of estimated item dimensions and/or volume. For example, if the volume of the container is known and two identical items are the only items in the container, the estimator may attribute half of the container volume to each of the items. In this example, the estimator may also assign the value of the longest dimension of the container to the length of each item. In this example, the estimator may assign the value of the second longest dimension of the container to the height of each item. Thus, in this example, a value for the width of each item may be estimated by dividing the estimated volume of each item by the length and height of the container.

In some embodiments, if there are known dimensions (actual or estimated) for one or more of the other items in the container, the product dimension estimator may attribute portions of the container volume and/or dimensions to those items before determining the estimated dimensions of the given item. In some cases, the given item may be the only item of unknown dimensions in the container. The automated product dimension estimator may consider the volume or dimensions of the items of known dimensions first, and then attribute the remaining portions of the container volume or dimensions to the given item, in one embodiment. For example, if there are three items in the container and the dimensions of two of the items are known, the estimator may calculate the volume of the items with known dimensions, subtract these volumes from the volume of the container, and attribute the remaining volume of the container to the given item. In one embodiment, the estimator may then assign estimated values for one or more dimensions of the given item, such as the length and height, according to the corresponding dimensions of the container, and divide the estimated volume of the given item by the estimated length and height to determine the estimated width.

Similarly, if the only items of unknown dimensions in the container are identical items, the product dimension estimator may consider the items of known dimension first, calculate their volume, subtract this from the container volume, attribute the remaining portion of the container volume to the identical items in equal amounts, and then determine estimated dimensions for each of the identical items as in the examples above.

In some embodiments, the product dimension estimator may not be able to determine an estimate for all three dimensions of an item, such as when an item is not completely contained within the container. In such embodiments, the product dimension estimator may determine one or more estimated dimensions and postpone estimation of one or more other dimensions until more information is available, such as when the item is placed in another container. In some embodiments, the estimator may capture identifiers of an item as it passes through a portal, rather than when it is located in a container. In some such embodiments, at most two dimensions, corresponding to the two-dimensional opening through which the item passed, may be estimated in response to determining that the item passed through the portal.

In some embodiments, it may not be necessary to determine all dimensions of an item. For example, for books, CDs, DVDs and VHS products, it may only be necessary to determine the height (if placed vertically) and width (thickness) of the items in order to be able to select an appropriate container for them, either because the third dimension of each item is a standard value or because the containers typically used to store or convey the items (such as book boxes, shelves, etc.) are of sufficient depth to hold the vast majority of such items. In other cases, it may only be necessary to determine one estimated dimension of an item, such as if both of the other dimensions correspond to standard dimensions for that item type.

The algorithms used by the product dimension learning estimator are not intended to be limited to those described above and may include any other algorithms suitable for estimating dimensions for multiple items, given their inclusion in multiple packages with overlapping contents, according to different embodiments. For example, the product dimension learning estimator may use different algorithms to describe the dimensions of multiple items using a plurality of simultaneous equations, and those equations may be solved using various assumptions for some of the dimensions or by collecting enough data from packages containing the items to completely resolve them.

Once the product dimension estimator has determined one or more estimated dimensions for the given item in the container, these dimensions may be stored in a table or database, as shown in 360. In one embodiment, the estimated dimensions are added to a database of intermediate data. In other embodiments, the estimated dimensions are compared to previously estimated dimensions for the item. In some embodiments, the previously estimated values may be replaced by new estimated dimensions. For example, if the given item has been placed in a container with one or more dimensions smaller than those of the previously estimated corresponding dimension(s) of the given item, the estimator may refine the estimated dimensions to reflect a smaller estimated value for those dimensions.

After storing any new or refined estimated dimensions of the given item, the estimator may, in some embodiments, be configured to continue to iterate on the operations described above, as illustrated by FIG. 3, to converge on the practical dimensions of the given item or to further reduce the estimated size envelope of the given item. Using successive estimations, the values of the given item's dimensions may be refined as the system learns more about the item from other containers in which an instance of the item is placed, or portals and/or paths used when handling an instance of the item in the facility. In some embodiments, all estimated dimensions for an item are stored for further analysis.

In an example embodiment, an e-commerce organization sells items of various types that can be shipped to customers. For the sake of simplicity, six example items are shown in an item parameter database, in Table 1A, below. In this example, each item has a corresponding unique identifier, name, and type in columns 1-3. The item parameter database also includes columns to store values for various parameters of the items in columns 4-7, which in this example embodiment include item volume, height, width, and length. While not shown, in other embodiments additional information may be stored, such as a confidence level for the parameter values, information on statistical variances in the parameter values, or other indications of allowable deviations from the estimated values. In some embodiments, determining a confidence level for one or more of the dimensions of an item may involve repeated estimations, followed by calculation of a mean or standard deviation, or detection of a trend, rate of change, or other pattern in the estimates. For example, if the estimates are narrowed down as an item is placed in successively smaller spaces within containers or passed through successively smaller portals or paths within the facility, the confidence level may go up with each successive estimate. In some embodiments, the product dimension learning estimator may count the number of estimates to determine a confidence level.

TABLE 1A

| item ID | item name | item type | item volume (cu ft) | item length (in) | item height (in) | item width (in) |
|---|---|---|---|---|---|---|
| 4325 | book1 | book | — | — | — | — |
| 2309 | book2 | book | — | 9.50 | 8.00 | 1.35 |
| 0873 | shoe17 | shoe | | | | |
| 1832 | DVD1 | DVD | — | 7.48 | 5.31 | 0.55 |
| 9983 | wine1 | wine | | | | |
| 8134 | hat1 | hat | | | | |

In this example embodiment, the entry for the item book2 includes initial dimension values supplied by its manufacturer and the entry for the DVD1 item may be filled in based on the fact that DVD1 is packaged in a standard single DVD case, which has known dimensions. The other parameter value fields of the item parameter database may be initially empty, as the system has not yet dynamically learned appropriate values for those parameters. From the known dimensions, however, the product dimension learning estimator may calculate the volume of book2 by multiplying the given dimensions together, with a result of 0.059 cubic feet. Similarly, the volume of DVD1 may be calculated by the product dimension learning estimator by multiplying together the dimensions of a standard single DVD case, with a result of 0.013 cubic feet.

In some embodiments, information regarding case sizes is supplied by the manufacturer. In one example, a manufacturer has supplied case information for the book1 item and the DVD1 item, as shown in Table 2 below. This case information includes the length, width, and height of a case containing multiple copies of the item and the number of items in a case. From this information, in some embodiments, the product dimension learning estimator may be able to calculate the volume of each item and may be able to estimate one or more dimensions of each item in the case.

In this example, using the parameter values in Table 2, the volume of a case containing 12 copies of the item book1 may be calculated by multiplying the dimensions of the case together, with a result of 1.936 cubic feet. Since the number of items in the case is 12, the volume of each of the items may be estimated to be the case volume (1.936) divided by the number of items (12), with a result of 0.161 cubic feet per item. Furthermore, since each dimension of an item may be assumed not to be larger than the corresponding dimension of a case containing multiple identical items, the product dimension learning estimator may, in some embodiments, estimate the maximum dimensions of an item based on case dimensions. For example, in one embodiment, the product dimension learning estimator may estimate the length of an item to be equal to the longest dimension of a case containing multiple copies of the item, in this case, a length of 19.5 inches for book1. In other embodiments, the product learning estimator may store case dimensions for later analysis or may ignore case dimensions.

TABLE 2

| item ID | item name | item case weight (lb) | item case length (in) | item case height (in) | item case width (in) | number of items/case |
|---|---|---|---|---|---|---|
| 4325 | book1 | — | 19.50 | 14.30 | 12.00 | 12 |
| 2309 | book2 | 52.8 | — | — | — | 24 |
| 0873 | shoe17 | | | | | |
| 1832 | DVD1 | — | 21.74 | 7.98 | 7.10 | 48 |
| 9983 | wine1 | | | | | |
| 8134 | hat1 | | | | | |

The case information illustrated in Table 2 may be included in Table 1A as additional columns, or may be maintained in a separate table or database, in various embodiments.

Figure 4:
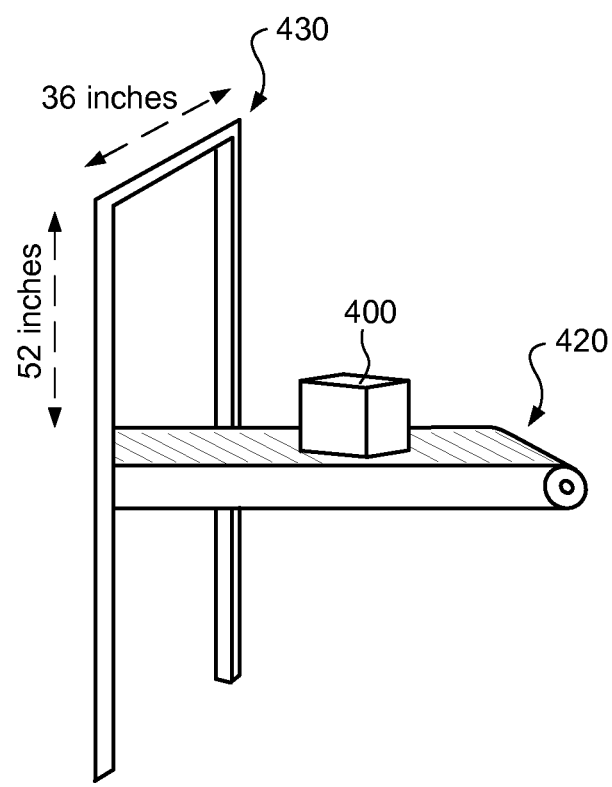
FIG. 4 illustrates an item passing through a portal of a materials handling facility, according to one embodiment.

In some embodiments, the estimator may estimate one or more dimensions of an item or a case containing multiple, identical items using information captured when the item or case passes through a portal in the materials handling facility. For example, FIG. 4 illustrates a box 400 on a conveyor belt 420 passing through a doorway 430, as when a box is unloaded from a receiving dock and enters the facility on a conveyor belt. In this example, the height of the "portal" is the distance between the top of conveyor belt 420 and the underside of the top of doorway 430, or 52 inches. The width of the portal, in this example, is equal to the width of doorway 430, or 36 inches. If box 400 contains only one item, the estimator may estimate the width and height of the item to be equal to the corresponding width and height of the portal, or 36 inches and 52 inches, respectively. If box 400 contains multiple, identical items, the estimator may estimate the height of each item to be equal to the height of the portal, 52 inches, and may defer estimation of the width until more information is gathered, in some embodiments. In other embodiments, the estimator may estimate the width of each item to be equal to the width of the portal, 36 inches, and may defer estimation of the height until more information is available. In still other embodiments, the estimator may divide one or more of the height and width of the portal by the number of items in box 400 to estimate the height and width of each item, or may estimate the height and width of each item to be equal to the height and width of the portal, such as if the identical items are stacked upright and in a line from front-to-back in box 400.

As previously described, the product dimension learning estimator may, in some embodiments, capture container, portal, or path information, such as container, portal, or path dimensions, container contents, or identifiers of items passing through a portal or on a path, in order to determine one or more estimated dimensions for each item handled using the container, portal or path. In some embodiments, dimensions and/or other parameter values may be stored in one or more tables or databases, such as the container database illustrated in Table 3 below. Dimension values for various containers, portals, and paths are shown in columns 4-9 of Table 3. Pre-determination of such values may make sense in a variety of situations, such as when there is only a small number of possible containers, portals, or paths, when the available containers, portals, or paths change only infrequently (if at all), when reliable values for parameters of those containers, portals, or paths are available from an external source, etc. In some embodiments, a manufacturer or supplier of a container may provide the values of various container parameters, including container dimensions. In other embodiments, container, portal, or path parameters may be pre-determined by measuring one or more instances of each container, portal, or path type, or by estimating the dimensions of a container (such as a box) based on portals or paths used in transporting the containers within the facility. As used in describing the example embodiments herein, references to a "container" may include any dimensionally-constrained environment, including conventional containers (e.g., boxes, bins, and the like), portals (doorways, hatches, etc.) and dimensionally-constrained paths (chutes, tracks, conveyor belts, etc.), as described herein. In this example, the available "containers" include three types of boxes in which items may be shipped (as shown in rows 1-3 of the database), three types of containers or paths in which items may be conveyed in the materials handling facility (as shown in rows 4-6 of the database), two types of containers in which items may be stored in the materials handling facility (as shown in rows 7-8 of the database), and one portal through which items may pass in the facility (as shown in row 9 of the database).

In the example illustrated by Table 3, the values for the length, width, height, and volume are shown for each container except for the conveyor belt, labeled belt1, and the portal, labeled gate7. In some embodiments, a manufacturer or supplier may provide the volume along with the dimensions, while in other embodiments, the product dimension learning estimator may calculate the volume from supplied or measured dimensions. In this example, the length and volume of belt1 may not be specified because the conveyor belt length may not be a restricting dimension. That is, as long as an item may be placed on the belt (without overlapping its width) and is not too tall to pass through any spaces in the materials handling facility through which the conveyor belt passes, the item may be said to "fit" on the conveyor belt. Similarly, the length and volume of gate7 may not be specified because they may not add any constraints on the items that pass through gate7.

In some embodiments, the product dimension learning estimator may store container dimensions and contents together in a table or database, such as Table 4 below, and use this information to determine one or more estimated dimensions for each item in the container. In this example, Table 4 illustrates a container parameters database, in which each entry (row) includes information about containers and their contents in the materials handling facility. Note that in some embodiments the grouping of items within containers may be temporary and may change with various operations of the facility. For example, items for several orders may be placed together in a tote during a "pick" operation and then sorted into different groups, by order, and placed into boxes for shipping. Therefore, the information stored in a container parameters database, such as the one illustrated by Table 4, may, in some embodiments, represent snapshots in time for particular containers and those containers may contain other items at other times. Each of these snapshots may include a unique group or package identifier, as shown in column 1, in some embodiments. In other embodiments, a package identifier may correspond to a particular customer order or container, rather than a snapshot of an item grouping. In this example, each entry includes a container name, a list of the container contents along with the number of copies of each item, and the volume, length, height, and width of the container. In another embodiment, the container dimensions and/or volume may not be included in the container parameters database if it is already stored in another database, such as the one illustrated by Table 3. In some embodiments, additional information may be stored in a container parameters database, such as a date or timestamp for each entry or a batch number or other identifier of specific item or item group instances. In other embodiments, more, fewer, or different parameters may be stored in a container parameters database, or similar information may be stored in other combinations in one or more other tables or databases, such as an intermediate dimensions database, described later.

TABLE 3

| container ID | container name | container type | volume (cu. ft.) | length (inches) | height (inches) | width (inches) |
|---|---|---|---|---|---|---|
| 413 | smallbox1 | box | 0.289 | 10.00 | 10.00 | 5.00 |
| 293 | smallbox2 | box | 0.972 | 14.00 | 12.00 | 10.00 |
| 338 | bigbox1 | box | 3.56 | 24.00 | 16.00 | 16.00 |
| 103 | tote1 | tote | 4.000 | 24.00 | 24.00 | 12.00 |
| 391 | cart2 | cart | 24.000 | 48.00 | 36.00 | 24.00 |
| 789 | belt1 | belt | — | — | 47.50 | 24.00 |
| 651 | bin7 | bin | 4.219 | 27.00 | 18.00 | 15.00 |
| 265 | shelf3 | shelf | 9.281 | 33.00 | 27.00 | 18.00 |
| 739 | gate7 | portal | — | — | 60.00 | 48.00 |

TABLE 4

| package ID | container | container contents | container volume | container length | container height | container width |
|---|---|---|---|---|---|---|
| 872093 | smallbox1 | book2 × 2, DVD1 × 2 | 0.289 | 10.00 | 10.00 | 5.00 |
| 832189 | smallbox2 | book1 × 2 | 0.972 | 14.00 | 12.00 | 10.00 |
| 098731 | smallbox2 | book2 × 2, DVD1 × 2, shoe17 × 2 | 0.972 | 14.00 | 12.00 | 10.00 |
| 631248 | big- | book1, | 3.56 | 24.00 | 16.00 | 16.00 |

TABLE 4-continued

| package ID | container | container contents | container volume | container length | container height | container width |
|---|---|---|---|---|---|---|
|  | box1 | book2, shoe17 |  |  |  |  |
| 873189 | bin7 | book1, book2 | 4.219 | 27.00 | 18.00 | 15.00 |
| 613495 | tote1 | shoe17, wine1, hat1 | 4.000 | 24.00 | 24.00 | 12.00 |
| 738068 | belt1 | book1, book2 × 2, wine1 | — | — | 47.50 | 24.00 |

In some embodiments, the information captured and stored in databases such as those illustrated by Tables 3 and 4 are used by the product dimension learning in estimator to determine estimated dimensions for the items in the materials handling facility. For example, returning to the items listed in Table 1A, the parameter values in Tables 3 and 4 may be used to estimate the dimensions of item book1 and item shoe17. The parameter values in Tables 3 and 4 may also be used in validating the dimensions of item book2, in some embodiments.

In this example, the product dimension learning estimator may analyze package 832189, corresponding to row 2 of Table 4, to determine estimated dimensions of item book1. According to this table, item group (package) 832189 is located in a smallbox2 and consists of three copies of book1. The volume of smallbox2 is 0.972 cubic feet, as shown in both Table 3 and Table 4, in this example. Therefore, the product dimension learning estimator may calculate an estimated volume for each of the three identical items in smallbox2 by dividing the volume of smallbox2 by three, for a result of 0.324 cubic feet per book. Because the dimensions of book1 may be assumed not to be larger than the container in which the books are located, the product dimension estimator may, in some embodiments, estimate one or more of the maximum dimensions of an item (in this case, book1) by assigning them to the values of the corresponding dimensions of its container (smallbox2). In this example, the estimator may estimate the length of book1 to be 14 inches and the height of book1 to be 12 inches. The product dimension estimator may, in some embodiments, estimate any remaining dimensions of an item by dividing the volume of the item by the previously estimated dimensions. In this example, the estimator may divide the volume (0.324 cubic feet) by the estimated length (14.0 inches) and height (12.0 inches) in order to determine an estimate for the width of book1, resulting in an estimated width of 3.33 inches.

Similarly, the product dimension learning estimator may determine estimated dimensions for shoe17 by analyzing package 098731 (corresponding to row 3 of Table 4). In this example, item package 098731 is located in smallbox2 and consists of two copies of item book2, two copies of item DVD1, and two copies of item shoe17. The volume of smallbox2, as shown in Tables 3 and 4, is 0.972 cubic feet. In this example, the product dimension estimator may use the known volumes of items book2 and DVD1 to determine an estimated volume for the remaining items (two copies of item shoe17). Subtracting 0.118 cubic feet (for two copies of book2) and 0.026 cubic feet (for two copies of DVD1) from 0.972 cubic feet (the volume of smallbox2) results in an estimated maximum volume for two copies of shoe17 of 0.848 cubic feet. The product dimension estimator may then divide 0.848 by two to determine an estimated volume of 0.424 cubic feet for each of the two copies of item shoe17, in this example. In some embodiments, the product dimension estimator may estimate one or more of the maximum dimensions of an item (in this case, shoe17) by assigning them to the values of the corresponding dimensions of its container (smallbox2). In this example, the estimator may estimate the length of shoe17 to be 14 inches and the height of shoe17 to be 12 inches.

The product dimension estimator may, in some embodiments, estimate any remaining dimensions of an item by dividing the volume of the item by the previously estimated dimensions. In this example, the estimator may divide the volume (0.424 cubic feet) by the estimated length (14.0 inches) and height (12.0 inches) in order to determine an estimate for the width of item shoe17, resulting in an estimated width of 4.36 inches. In other embodiments, the product dimension estimator may use other information, such as industry-standard or company-standard values or policies, in determining one or more dimensions of an item. For example, if all of the shoes supplied by a particular vendor come in boxes that are no more than eight inches wide, the estimator may estimate the width (or height, if the system assigns the second largest dimension of all items to be the height) of all shoe items from that vendor to be eight inches wide. In the example described above, if the estimator estimates the length to be 14 inches and the "height" to be 8 inches, then the estimator may calculate the estimated width to be 0.424 cubic feet divided by 14 inches, and further divided by 8 inches, resulting in an estimated width of 6.54 inches.

In some embodiments, once the product dimension learning estimator determines a first estimate for the volume or one or more dimensions of an item, the estimated parameter value is stored in the item parameters database. In this example, Table 1B, below, is a copy of Table 1A, with various parameter values filled in (in italics) according to the estimates performed in the examples described above.

TABLE 1B

| item ID | item name | item type | item volume (cu ft) | item length (in) | item height (in) | item width (in) |
|---|---|---|---|---|---|---|
| 4325 | book1 | book | 0.324 | 14.00 | 12.00 | 3.33 |
| 2309 | book2 | book | 0.059 | 9.50 | 8.00 | 1.35 |
| 0873 | shoe17 | shoe | 0.424 | 14.00 | 8.00 | 6.54 |
| 1832 | DVD1 | DVD | 0.013 | 7.48 | 5.31 | 0.55 |
| 9983 | wine1 | wine |  |  |  |  |
| 8134 | hat1 | hat |  |  |  |  |

As illustrated in FIG. 3, the product dimension learning estimator may in some embodiments be configured to continue to analyze data from item packages to refine the estimated dimensions of items. In such embodiments, item package 613495, containing an instance of shoe17, and item packages 873189 and 738068, each containing an instance of item book1, may be analyzed as described above to determine if the estimated dimensions of these items should be refined. In this example, analyzing these item packages would not result in a reduced size envelope for the items. However, analysis of other item packages (not shown) may result in refined estimates for these items, according to this example. As previously discussed, the exact dimensions of items shoe17 and book1 may not ever be determined by the product dimension estimator, in some embodiments, but the estimated dimensions shown in Table 1B, or any refined estimates determined in a future iteration, may be sufficient to facilitate efficient operation of the materials handling facility.

As previously described, the product dimension learning estimator may analyze information stored in container parameters databases and package parameters databases, as described above, to validate previously estimated or supplied values for item dimensions, in some embodiments. In the preceding example, the initial dimensions of book2 were provided by a supplier and stored in the item parameters database, as shown in Tables 1A and 1B. The package parameters database illustrated by Table 4 shows a package 872093, located in a smallbox1 and consisting of two copies of item book2 and two copies of item DVD1. In this example, the volume of smallbox1, as shown in Tables 3 and 4, is 0.289 cubic feet, and the estimated volumes of items book2 and DVD1, as shown in Table 1B, are 0.059 cubic feet and 0.013 cubic feet, respectively. The product dimension learning estimator may, in some embodiments, determine if the estimated volumes and dimensions of book2 and DVD1 are consistent with their presence in a container smallbox1. For example, the product dimension learning estimator may compare the total volume of two copies of book2 (2×0.059 cubic feet) and two copies of DVD1 (2×0.013 cubic feet), which is 0.144 cubic feet, to the maximum volume of smallbox1, which is 0.289 cubic feet. In this example, the estimated lengths of item to book2 and item DVD1 (9.50 inches and 7.48 inches, respectively) may also be compared by the product dimension learning estimator to the maximum length that will fit in smallbox1 (10 inches). Similarly, the estimated heights of item book2 and item DVD1 (8.00 inches and 5.31 inches, respectively) may be determined by the product dimension learning estimator to be smaller than the maximum height that will fit in smallbox1 (10 inches). And finally, the product dimension estimator may, in some embodiments compare the widths of the items (1.35 inches and 0.55 inches) to the width of smallbox1 (5.00 inches), to see that they should, indeed, fit within the container, given the estimated dimensions. Determining that the estimated volume and/or dimensions of the items are consistent with package data for the item grouping may be one method of validating previously estimated dimensions, whether provided by a supplier or determined by the product dimension learning estimator, according to various embodiments.

In some embodiments, besides comparing the individual dimensions of an item to the corresponding dimensions of a container, the product dimension estimator may be configured to determine a combined dimension of two or more items in the container and to compare that to the corresponding container dimension, according to a particular placement or orientation of the items in the container. For example, if the two books and two DVDs of the preceding example are placed side by side in container smallbox1, such that the widths of the items are additive, then the total width of all the items would be 2×1.35+2×0.55=3.80 inches. In this example, since the combined width is less than the width of smallbox1 (5 inches) the items would fit in the container in this orientation, thus validating the estimated parameter values. In some embodiments, the product dimension learning estimator may be configured to calculate such combined dimensions of multiple items in a container according to multiple possible placements and orientations. In some embodiments, the product dimension learning estimator may be configured to consider multiple placements and orientations when estimating the dimensions of one or more items in a container. For example, an item that is placed at an angle in a box may fit into a box for which the longest dimension is smaller than the longest dimension of the item. In such cases, the box dimensions may be used to estimate the item dimensions, since they may represent the "practical dimensions" of the item.

Recommendations Based on Estimated Product Dimensions

In some embodiments, item dimension estimates determined by an automated product dimension estimator may be used to recommend suitable containers, portals, or paths which may be used in storing or conveying one or more products within a materials handling facility or in which to ship one or more products to a customer. One such embodiment is illustrated in the flow chart of FIG. 5. In this example, a first step may be to receive an indication of which items will be stored, conveyed or shipped together, as shown at 500. In various embodiments, this indication may take the form of a stow list, pick list, inventory list, order, packing list, etc., and may be a physical list, such as a printed list, or may be a virtual list, such as may be contained in a memory accessed directly by the automated product dimension learning estimator, or such as may be displayed on a monitor, handheld device, or other suitable display mechanism. In some embodiments, such a list may be scanned automatically or by an agent in the materials handling facility to serve as an input to the automated product dimension learning estimator.

Once the items to be grouped are known, the automated product dimension learning estimator may retrieve any estimated parameters of the items, as shown in 510. In some embodiments, estimated dimensions and/or volumes of the items may be retrieved from a table or database, such as Table 1A or Table 1B described above.

In some embodiments, an automated product dimension learning estimator may be configured to recommend a container, portal, or path for handling the group of items based on the estimated volume and/or dimensions of each of the items, as in 520. In some embodiments, the automated product dimension learning estimator may calculate overall dimensions of the group of items based on the item dimensions as well as dimensions of any required non-item contents (if any). In such cases, the estimator may recommend a smallest available container in which the grouped items will fit, a portal through which they may pass, or a dimensionally-constrained path on which they may be conveyed based on the calculated overall dimensions. In other embodiments, the estimator may use a standard or custom bin packing algorithm to determine, for each available container, whether or not the items will fit in the container. In some embodiments, the estimator may start by determining if the items will fit in the smallest available container, or through the smallest portal or path, and if not, repeating its determination for each other container, portal, or path in turn, from smallest to largest, until determining that the items will fit into one of the containers or through one of the portals or paths. In other embodiments, the identification of suitable containers, portals, or paths for handling the package may be performed in other manners. For example, the product dimension learning estimator may track container, portal, or path types corresponding to those handling various groups of item contents, and if so, may retrieve an indication of one or more appropriate container, portal, or path types for handling the current item contents based on a stored mapping for those contents.

Recommending a container, portal, or path may include displaying in indicator of the container, portal, or path to be used on an input/output device readable by an agent working in the materials handling facility, in some embodiments. In other embodiments, a recommendation for a container, portal, or path may be printed for an agent, such as on a pick list or packing list. In still other embodiments, a machine may be configured to pick and/or present a container (such as a box) to an agent or to an automated packing system based on the estimator's recommendation or to automatically transport the items to a portal or path for further handling.

Once a container, portal or path has been recommended, the items may be placed in the recommended container, passed through the recommended portal, or placed in the recommended chute, for example. This may be detected automatically by the estimator, as in 530, or an agent may provide feedback to the estimator that the items have been so handled. In some embodiments, a packing agent may place the items in a container recommended by the automated product dimension learning estimator, pass the items through a portal recommended by the estimator, or place them in a recommended chute, for example. In other embodiments, an automated packing or conveyance system may be used to handle the items.

After the items are placed in the recommended container, portal, or path, a determination is made as to whether or not the recommended container, portal, or path is appropriate for handling the items, as shown at 540. This determination may be made manually or visually by an agent working in the facility or may be determined automatically, such as by a packing system or scanning device, in some embodiments. For example, a packing system may include a scanner or sensors and software to detect that one or more items is sticking out of a box or bin, that a box will not close, or that a bin is half-empty. In another example, an agent working in the facility may visually detect that one or more items is not completely contained within a bin, tote, or shelf, that one or more items will not fit through a portal or in a chute, or that a bin, tote, or shelf is not filled to near its capacity.

If the recommended container, portal, or path is too large, that is, if it is larger than necessary to handle the group of items, the items may be re-located to a smaller container, portal, or path, as shown at 550. In some embodiments, the estimator may recommend a container, portal, or path that is larger than it needs to be when it has not received enough information about one or more of the items in the group to narrow the estimated dimensions of the items. Determining that a recommended container, portal, or path is too large may be done visually, such as by an agent working in the facility, or automatically, as described above. In some cases, if the recommended container, portal, or path is too large for the group of items, the product dimension learning estimator may indicate that a manual review should be performed to determine if one or more of the intended items is not present in the item group. In this way, the product dimension learning estimator may be used to determine package incongruities when the recommended container, portal, or path is not appropriate for the estimated volume or dimensions of a group of items, in some embodiments.

If the recommended container, portal, or path is too small, that is, if it is not large enough to handle the group of items, the items may be re-located to a larger container, portal, or path, as shown at 560. In some embodiments, the estimator may recommend a container, portal, or path that is smaller than it needs to be when it has not received enough information about one or more of the items in the group to determine its estimated dimensions or when the assumptions made when estimating the dimensions of one or more of the items were incorrect. Determining that a recommended container, portal, or path is too small may be done visually, such as by an agent working in the facility, or automatically, such as described above. In some cases, if the recommended container, portal, or path is too small for the group of items, the product dimension learning estimator may indicate that a manual review should be performed to determine if one or more of the items in the item group is not intended for the package, such as if an additional item is present or if one of the items has been replaced by an unintended (larger) item. Thus, the product dimension learning estimator may again be used to determine package incongruities when the recommended container, portal, or path is not appropriate for the estimated volume or dimensions of the group of items, in some embodiments.

A method for recommending a container, portal, or path for a group of items in a materials handling facility, as described herein, may include a feedback step, as shown at 570. In this example, an indication of the actual container, portal, or path used to handle the group of items may be returned to the estimator. In some embodiments, this feedback may be automatic, such as if a container and its contents are scanned when items are placed in the container. In other embodiments, this indication may be input by an agent working in the warehouse. In one embodiment, as described above, additional feedback may be included to indicate whether or not the recommended container, portal, or path was used, and/or one or more reasons why it was not, if it was not. In another embodiment, the results of any manual reviews of containers and their contents may be included in the feedback step illustrated at 570.

If an indication is returned regarding the actual container, portal, or path in which the items were handled, the estimator may be configured to update one or more estimated dimensions of one or more items in the group, as in 580. For example, if the longest dimension of a container used is shorter than the length estimated for one of the items, the estimated value may be updated to reflect that it is not likely to be longer than the length of the container. As previously described, updating item dimensions may include adding additional estimates to a table or database, or replacing values of estimates with new values, according to different embodiments. In some embodiments, updating dimensions may include confirming existing values of estimates, or updating a status or confidence level of an estimate, such as a status or confidence level based on the number of estimates, a pattern of estimates, a declining rate of change, etc.

Figure 5:
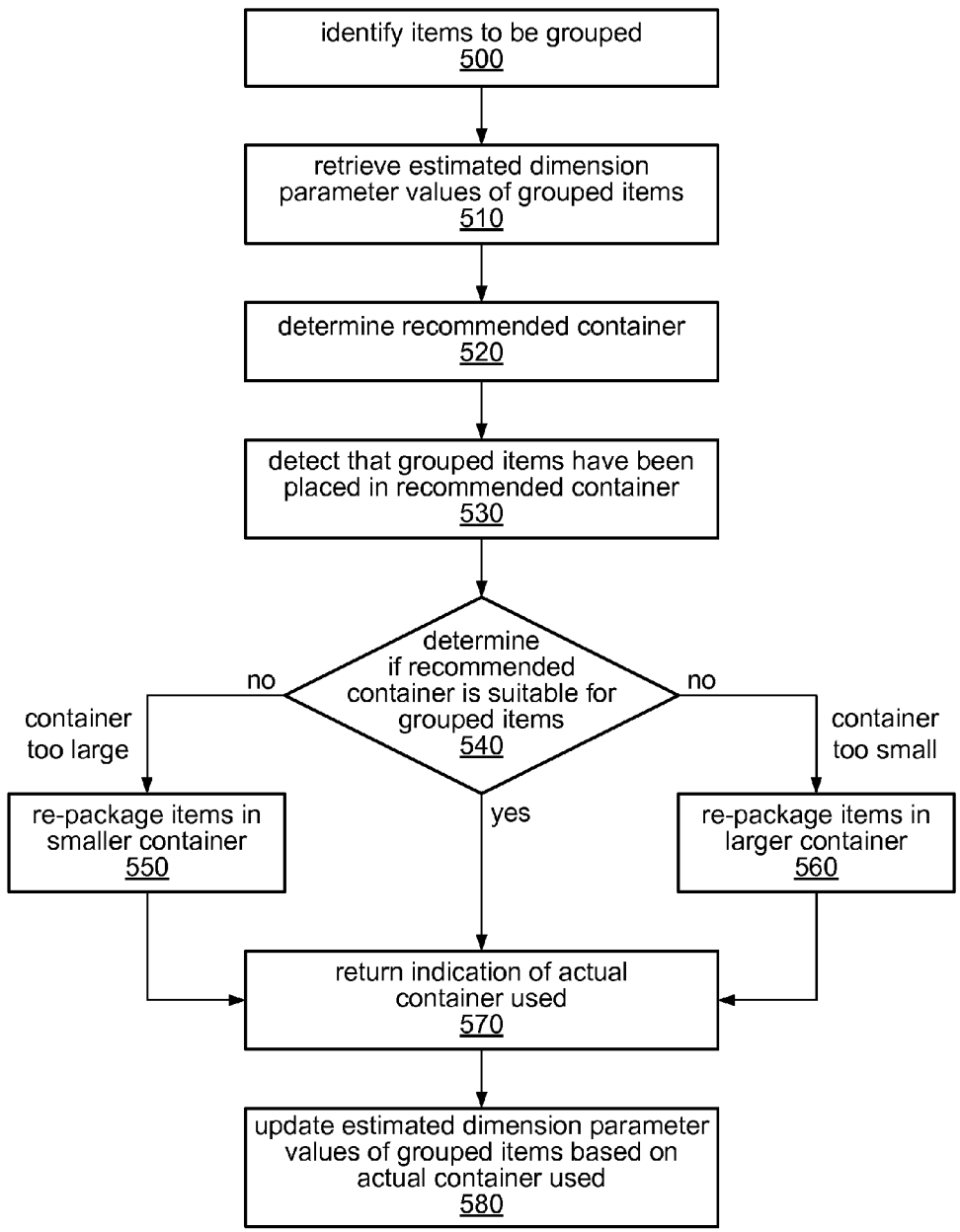
FIG. 5 illustrates one embodiment of a method for recommending a container for a group of items.

While the example illustrated by FIG. 5 is described in terms of a group of two or more items, the method may applied by the system to recommend a container, portal, or path suitable for handling a single item in the materials handling facility, in other embodiments.

In some embodiments, such as those described herein, it may be assumed that all items in a group fit entirely into each of the containers in the materials handling facility into which they are placed. In other embodiments, this restriction may not be required. For example, in some embodiments, it may be permissible for items to stick out of the top or side of a tote, belt, etc., when being stored or transported within the materials handling facility. In these embodiments, there may need to be additional information input to the system to allow all item dimensions to be estimated, such as when these items are subsequently placed into containers in which they are completely contained. In some embodiments, these items may be manually measured or scanned by an agent in the facility. In other embodiments, it may not be necessary to determine all of the dimensions of these items.

In some embodiments, the dimensions and/or volume of non-item contents, such as air bags or foam used as padding or filler, promotional inserts, etc., may be provided by the supplier or may be determined by the product dimension learning estimator, using the methods described herein for determining parameters of product items. While not illustrated in this example, a variety of other types of item and package parameters may similarly be used, and the facility may similarly learn appropriate parameter values for the packaging materials rather than starting with defined values. In addition, changes in parameter values for packaging material and non-item contents may similarly be detected and updated in a manner similar to that for item parameter values.

As previously noted, the product dimension learning estimator may in some embodiments be used to recommend an inventory area or other container suitable for storing or conveying an item in the materials handling facility based on the estimated dimensions of the item, the estimated dimensions of available inventory areas or containers, and the estimated dimensions of any other items currently located in the area or container. For example, Table 4 illustrates an item package 873190, stored in a container of type bin7, containing one copy of book1 and one copy of book2. In some embodiments, the product dimension learning estimator may be configured to determine the amount and/or shape of any free space in the inventory area based on the estimated dimensions of these items, as shown in Table 1B, and the dimensions of bin7, as shown in Table 4. In this example, if another instance of book1 needs to be stored, the product dimension estimator may be configured to determine that bin7 has sufficient available space to hold the additional copy of book1.

Other Uses of Estimated Item Dimensions

In some embodiments, the product dimension learning estimator may use a comparison of related packages to identify problems with one or more of the packages. For example, the product dimension learning estimator may use the package in entry 832189, with its item contents in a smallbox2, to determine that another package with the same item contents in a bigbox1 used an inappropriately large box (thus increasing materials costs and shipping costs). Similarly, any future shipment that included those same item contents may be flagged as being incongruous if it was placed in a box larger than smallbox2.

The product dimension learning estimator may in some embodiments be configured to detect changes in an item, based on estimated dimensions that differ significantly from previously estimated dimensions. For example, if two copies of item book1 are detected in a container of type smallbox2, but a previous item package consisting of two copies of item book1 did not fit in a container of type smallbox2, the product dimension estimator may determine that the estimated dimensions of item book1, as shown in Table 1B, may have changed. In some embodiments, detecting that these items fit in a container smaller than one that would be recommended by the estimator may prompt a manual review of the item package. In other embodiments, this information may be stored for further analysis, such as to determine if all of the items of type book1 have changed, if items of type book1 come in multiple sizes or shapes, or if copies of item book1 from different suppliers are of different sizes or shapes.

As previously noted, a product dimension learning estimator may in some embodiments be configured to facilitate item identification for a picking operation. For example, if a copy of item book1 is on a pick list, an agent may be directed to the inventory area corresponding to item package 873189. As shown in Table 4, this item package is stored in a container of type bin7 in the facility and consists of one copy of item book1 and one copy of item book2. In this example, the agent may be directed to select the "taller" book from this area, as the estimated height of item book1 is 12 inches and the estimated height of item book2 is 8 inches, as shown in Table 1B. As shown in this example, the exact heights of items book1 and book2 may not be needed to facilitate item identification for picking, as the estimated dimensions may be accurate enough to distinguish the relative heights of these items.

Exemplary System Embodiment

Automated product dimension learning estimation, as described herein, may be implemented in one or more software modules or using a combination of hardware and software modules. One embodiment of a software implementation is illustrated in FIG. 6A. In this example, the product dimension learning estimator is implemented by program instructions 600, which include five software modules. In other embodiments, the functions of each of these software modules may be partitioned or combined in more or fewer modules or in any combination of hardware and software modules.

In the example illustrated by FIG. 6A, one software module is information gatherer 610. This software module may implement the functions illustrated in FIG. 3 at 310 (capture contents of container) and 320 (retrieve dimensions of container), in one embodiment. As described earlier, capturing the contents of a container may include capturing identifiers of both the container and its contents, and may be performed when items are placed in the container, when items are removed from the container, or at any other time. In some embodiments, these identifiers may be captured automatically by sensors or scanners. In other embodiments, an agent working in the facility may cause them to be captured by using a scanner or other means, in various embodiments. In some embodiments, information gatherer 610 may automatically capture the identifiers of items as they pass through a portal, such as illustrated in FIG. 4, or as they enter or exit a dimensionally-constrained path, such as a chute, track, or pipe. Information gatherer 610 may, in some embodiments, include program instructions configured to control such automated capturing and/or may include program instructions configured to receive this information as inputs and store it in memory, as described later. Information gatherer 610 may also include instructions configured to retrieve the dimensions of containers, portals, and paths, such as by accessing their values in memory according to a captured identifier, in some embodiments.

Another software module shown in the example illustrated by FIG. 6A is recommender 615. In some embodiments, this routine includes program instructions configured to implement functions 500-520 of FIG. 5. Thus, in some embodiments, recommender 615 includes program instructions configured to identify items to be grouped for one of the operations of the materials handling facility. In this example, identifying items to be grouped may include receiving or generating a stow list, pick list, inventory list, order, packing list, etc., which may be a physical list, such as a printed list, or may be a virtual list, such as may be contained in memory, displayed on a monitor or other input/output device, or scanned automatically or by an agent in the materials handling facility to serve as an input to the automated product dimension learning estimator. Recommender 615 may also include program instructions configured to retrieve any known (actual or estimated) dimensions of any of the items in the group, in some embodiments. As described above, these estimated dimensions may be retrieved from a table or database, such as Table 1A or Table 1B. Finally, recommender 615 may be configured to determine a recommended container, portal, or path for handling the group of items, as illustrated at 520 and described in detail above.

Program instructions 600 may also include item parameter determiner 620, in some embodiments. This software module may, in some embodiments, include program instructions configured to implement functions 330-360 of FIG. 3. These functions may use information collected and stored by information gatherer 610 and any known (actual or estimated) dimensions of items as input, may calculate estimated dimensions of one or more other items, and may store in memory these estimated dimensions and/or intermediate data to be used later to estimate dimensions of one or more items, as described in detail above.

Another software module making up a product dimension learning estimator may be a feedback handler, as in 625 of FIG. 6A. In some embodiments, this module may include program instructions configured to implement receiving feedback from various operations of a materials handling facility to be used by the product dimension learning estimator. This feedback may include an indication of whether or not a recommended container, portal, or path was used, a reason that a recommended container, portal, or path was not used, an indication that one or more items was not completely located within a container, information gathered during a manual review of packages or containers, or any other feedback from the various operations of the facility.

In some embodiments, the feedback handler may receive manual feedback related to packages and item contents of packages from other sources, such as based on item/package returns and/or customer support interactions. (e.g., an indication of package correctness or incorrectness, or details about one or more verified package or item parameter values). In some embodiments, feedback handler 625 may include program instructions configured to control one or more input/output devices used to provide automated feedback, such as sensors or scanners, or may include program instructions configured to receive feedback entered manually by an agent in the facility, such as by entering it at a terminal or by pressing one or more buttons, levers, switches, etc.

Finally, as shown in FIG. 6A, an automated product dimension learning estimator may include a parameter value auto-updater 630. In this example, parameter value auto-updater 630 may include program instructions configured to implement updating one or more tables or databases of parameters associated with items and containers in a materials handling facility. In some embodiments, parameter value auto-updater 630 may receive input from feedback handler 625, item parameter determiner 620, or information gatherer 610. Parameter value auto-updater 530 may, in some embodiments, include program instructions configured to implement updating estimated or actual item dimension values, estimated or actual container dimension values, estimated or actual item or container volumes, status or confidence level values for any estimated values, or any other parameters stored in the one or more databases used by the product dimension learning estimator.

In some embodiments, parameter value auto-updater 630 may be configured to do various analyses over the parameter measurements for multiple packages to identify trends in changing parameter values or to identify consistent problems with items and/or measurement devices. The auto-updater may operate on a continual basis (e.g., as a background process) or instead periodically, and may take various actions when a determination is made that parameter values should be updated or that other corrective action should be taken (e.g., interacting with other product dimension learning estimator components and/or external devices, updating values in the databases, etc.), according to various embodiments. In addition, the auto-updater may in some embodiments consider the source of values when performing updating based on them, such as to consider reliability of the values (e.g., by weighting information from a manual review differently from automatically obtained values, such as to consider it more accurate).

A system employing automated product dimension learning estimation may, in some embodiments, include one or more tables, databases, or other data structures used for storing and retrieving various parameter values used in conjunction with the system and methods described herein. For example, FIG. 6B illustrates one embodiment of a data storage component 600, comprising four separate databases.

In one embodiment, a system for automated product dimension learning estimation may include an item database 655. Item database 655 may include any data related to the items in the materials handling facility, such as names, quantities, descriptions, pricing, cost, or any other information that may be included in a product catalog, inventory management system, or other representation of the items in the materials handling facility, in various embodiments. In one embodiment, item database 655 may include case information for an item, such as the information in Table 2 described above. A product dimension learning estimator may, in some embodiments, retrieve any of this information from item database 655 necessary to perform the various functions of the estimator described herein.

A system for automated product dimension learning estimation may, in some embodiments, include a container database 660. In various embodiments, container database 660 may include any data related to the containers, portals, or paths used for storing, conveying, or shipping the items of the materials handling facility, as described herein. For example, container database 660 may include entries for each type of container, portal, and path used in the facility, along with its dimensions and volume, as shown above in Table 3. The information in container database 660 may be retrieved by the estimator, as shown at 320 of FIG. 3, and used in determining one or more estimated dimensions of one or more items in a container, as described above. In some embodiments, container database 660 may include other information about containers, such as the weight, color, composition, quantity, supplier name, or any other information that may be useful to the various operations of the materials handling facility.

As shown in FIG. 6B, a system for automated product dimension learning estimation may include an item parameters database 665, in some embodiments. Item parameters database 665 may, in some embodiments, include values for various parameters of the items in the materials handling facility, such as an identifier, a weight, a volume, a length, a height, and a width. Tables 1A and 1B illustrate examples of the data that may be included in item dimensions database 665. In some embodiments, only the most current estimated values are stored in item dimensions database 665, and they may be replaced with new estimates as the system "learns" the values. In other embodiments, item parameters database 665 may store multiple estimates for the values of each of the parameters therein, and these values may be used by the estimator for later analysis, such as the calculation of a mean or standard deviation, or to detect a pattern or rate of change in the values. In some embodiments, item dimension database 665 and item database 655 may be combined in one database such as by adding columns or rows to one database with the additional data of the other, or the information in item dimension database 665 and item database 655 may be partitioned differently and included in one or more other data structures.

In some embodiments, a system for automated product dimension learning estimation may include a container parameters database 670. Container parameters database 670 may, in some embodiments, include information about containers and their contents, such as that illustrated in Table 4 above. In this example, container parameters database 670 may include container contents, as well as the container (and/or package) identifier, type, volume and dimensions. In other embodiments, container parameters database 670 may include items or groups of items that have passed through a portal or path, as well as the identifier, type, and dimensions of the portal or path. In some embodiments, container parameters database 670 and container database 660 may be combined in one database, such as by adding columns or rows to one database with the additional data of the other, or the information in container parameters database 670 and container database 660 may be partitioned differently and included in one or more other data structures. In some embodiments, container parameters database 670 is used to store intermediate data to be used later by the estimator, such as if the system does not have enough information to determine estimated dimensions for one or more of the items in a container when its contents are determined. In other embodiments, this intermediate information, which may include values for the same parameters as those shown in Table 4, may be stored in an intermediate dimensions database 675. In some embodiments, the estimator may fill in the values for the entries of container parameters database 670 once it has enough information to determine an estimate. In some embodiments, the estimator may replace the values in container parameters database 670 and/or intermediate dimensions database 675 with new values as the system "learns".

In various embodiments, the parameter values and other data illustrated herein as being included in one or more databases may be combined with other information not described or may be partitioned differently into more, fewer, or different data structures. In some embodiments, databases used in automated product dimension learning estimation, or portions thereof, may be physically located in one memory or may be distributed among two or more memories. These memories may be part of a single computer system or they may be distributed among two or more computer systems, such as two computer systems connected by a wired or wireless local area network, or through the Internet, in different embodiments.

The various methods as illustrated in the figures and described herein represent exemplary embodiments of methods. The methods may be implemented in software, in hardware, or in a combination thereof in other embodiments. Similarly, the order of any method may be changed, and various elements may be added, reordered, combined, omitted, modified, etc., in other embodiments.

Figure 7:
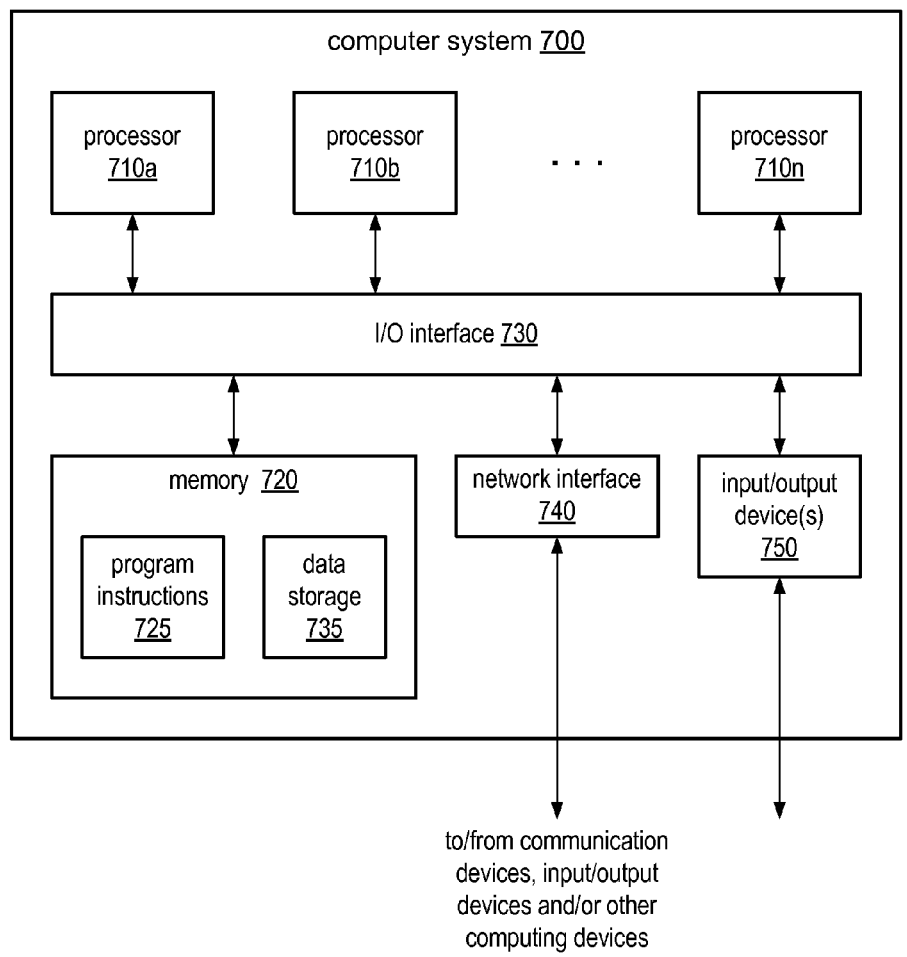
FIG. 7 is a block diagram illustrating an exemplary embodiment of a computer system suitable for implementing product dimension learning estimation.

Automated product dimensions learning estimation, as described herein, may be executed on one or more computer systems, interacting with various other devices in a materials handling facility, according to various embodiments. One such computer system is illustrated by FIG. 7. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750. In some embodiments, it is contemplated that automated product dimension learning estimation may be implemented using a single instance of computer system 700, while in other embodiments multiple such systems, or multiple nodes making up computer system 700, may be configured to host different portions or instances of automated product dimension learning estimation. For example, in one embodiment some data sources or services (e.g., capturing container information) may be implemented via one or more nodes of computer system 700 that are distinct from those nodes implementing other data sources or services (e.g., recommending a container for an item package). In some embodiments, a given node may implement the functionality of more than one component of automated product dimension learning estimation.

In various embodiments computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement automated product dimension learning estimation, and data storage 735, comprising various tables and/or databases accessible by program instructions 725. In one embodiment, program instructions 725 may include the software modules illustrated in FIG. 6A and data storage 736 may include the databases illustrated in FIG. 6B. In other embodiments, different software modules and databases may make up an automated product dimension learning estimator.

Users may interact with the product dimension learning estimator in various ways in different embodiments, such as to review and/or manually specify parameter values for items and/or packaging, as well as to specify thresholds to be used when determining allowable parameter deviations. For example, some users may have physical access to computing system 700, and if so may interact with various input/output devices 750 to provide and/or receive information. Alternatively, other users may use client computing systems to access the product dimension learning estimator, such as remotely via network interface 740 (e.g., via the Internet and/or the World Wide Web). In addition, some or all of the product dimension learning estimator components may provide various feedback or other general types of information to users (e.g., in response to user requests) via one or more input/output devices 750.

Those skilled in the art will appreciate that computing system 700 is merely illustrative and is not intended to limit the scope of the present invention. In particular, the computing system and devices may include any combination of hardware or software that can perform the indicated functions, including computers, network devices, internet appliances, PDAs, wireless phones, pagers, etc. Computing system 700 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

In some embodiments the automatic learning of the estimated item parameters may be based on stochastic parameter estimation and the determination of an allowable variation in an anticipated parameter for a package may be based on a calculated confidence interval. A stochastic closed-loop system may provide an adaptive method of estimating item dimension data while accommodating variation in item dimensions, the measurement process model, and changes over time. Examples of stochastic parameter estimation techniques that may be used in various embodiments include Kalman estimators, Bayesian statistics, and models of system dynamics. However, as a simplifying measure, the estimation of item parameters may be performed in some embodiments based on a deterministic approach, in which an assumption is made that there is no variation in the dimensions of the items or their volumes.

Those skilled in the art will appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer accessible storage medium, other aspects may likewise be so embodied.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more computing nodes, each of which comprises at least one processor and a memory, wherein the one or more computing nodes are configured to perform:
   estimating a value for each of one or more spatial dimensions of an item in a materials handling facility dependent on corresponding spatial dimensions of each one of two or more separate dimensionally-constrained environments in which the item has been handled in temporal succession, wherein:
      each of the two or more separate dimensionally-constrained environments comprises a container or other apparatus in or upon which the item was received, stored, packed, shipped or conveyed, or a portal or path through or upon which the item was conveyed; and
      the item was handled in each of the two or more dimensionally-constrained environments in temporal succession, either individually or together with one or more other items; and
   performing a subsequent operation in the facility involving an instance of the item that does not require knowledge of an exact dimension of the item, wherein said performing comprises using the estimated value of at least one of the one or more spatial dimensions of the item as its practical dimensions.

2. The system of claim 1,
wherein the item is handled individually in each of the two or more separate dimensionally-constrained environments in temporal succession; and
wherein said estimating comprises assigning the value for each given spatial dimension of the one or more spatial dimensions of the item based on a known or estimated measurement of a smallest one of the spatial dimensions of the two or more separate dimensionally-constrained environments that correspond to the given spatial dimension of the item.

3. The system of claim 1, wherein said estimating comprises calculating an estimated size envelope into which the item will fit, dependent on the estimated dimensions of the item.

4. The system of claim 3,
wherein the item is handled together with one or more other items in at least one of the two or more dimensionally-constrained environments; and
wherein said calculating an estimated size envelope into which the item will fit is further dependent on known or estimated dimensions of the one or more other items.

5. The system of claim 3, wherein the one or more computing nodes are further configured to perform:
in response to the item being subsequently handled in a dimensionally-constrained environment that is smaller than the two or more dimensionally-constrained environments, calculating a reduced size envelope into which the item will fit dependent on known or estimated dimensions of the smaller dimensionally-constrained environment.

6. The system of claim 3, wherein the one or more computing nodes are further configured to perform:
in response to the item being subsequently handled in a portion of a dimensionally-constrained environment that is smaller than a portion of one of the two or more dimensionally-constrained environments that was attributed to the item, calculating a reduced size envelope into which the item will fit dependent on dimensions of the smaller portion.

7. The system of claim 1, wherein the subsequent operation in the facility comprises an operation to select a dimensionally-constrained environment in the facility in which to store an instance of the item, and wherein selecting the dimensionally-constrained environment comprises selecting a dimensionally-constrained environment having sufficient space available to hold an item having the practical dimensions of the item.

8. The system of claim 1, wherein the subsequent operation in the facility comprises an operation to select a container in which to pack an instance of the item for shipping, and wherein selecting the container comprises selecting a container large enough to hold an item having the estimated dimensions of the item.

9. The system of claim 1, wherein the subsequent operation in the facility comprises an operation to select a container in which to pack an instance of the item and one or more other items for shipping, and wherein selecting the container comprises selecting a container large enough to hold an item having the estimated dimensions of the item and the one or more other items.

10. The system of claim 1, wherein the subsequent operation in the facility comprises an operation to present instructions to pick an instance of the item from an inventory area in the facility, and wherein presenting the instructions comprises presenting instructions indicating a relative size of one of the practical dimensions of the item compared to a corresponding dimension of one or more other items in the inventory area.

11. A method, comprising:
performing, by one or more computers:
   estimating a value for each of one or more spatial dimensions of an item in a materials handling facility dependent on corresponding spatial dimensions of each one of two or more separate dimensionally-constrained environments in which the item has been handled in temporal succession, wherein:
      each of the two or more separate dimensionally-constrained environments comprises a container or other apparatus in or upon which the item was received, stored, packed, shipped or conveyed, or a portal or path through or upon which the item was conveyed; and
      the item was handled in each of the two or more dimensionally-constrained environments in temporal succession, either individually or together with one or more other items; and
   selecting a dimensionally-constrained environment in the facility in which to store an instance of the item, wherein said selecting comprises selecting a dimensionally-constrained environment that has sufficient space available to hold an item having the estimated spatial dimensions of the item.

12. The method of claim 11,
wherein the item is handled individually in each of the two or more separate dimensionally-constrained environments in temporal succession; and
wherein said estimating comprises assigning the value for each given spatial dimension of the one or more spatial dimensions of the item based on a known or estimated measurement of a smallest one of the spatial dimensions of the two or more separate dimensionally-constrained environments that correspond to the given spatial dimension of the item.

13. The method of claim 11, wherein said estimating comprises calculating an estimated size envelope into which the item will fit, dependent on the estimated dimensions of the item.

14. The method of claim 11,
wherein the item is handled together with one or more other items in at least one of the two or more dimensionally-constrained environments; and
wherein said calculating an estimated size envelope into which the item will fit is further dependent on known or estimated dimensions of the one or more other items.

15. The method of claim 11, further comprising:
selecting a container in which to pack an instance of the item for shipping, wherein said selecting comprises selecting a container large enough to handle an item having the estimated dimensions of the item.

16. A non-transitory, computer-readable storage medium storing program instructions that when executed on one or more computers cause the one or more computers to perform:
estimating a value for each of one or more spatial dimensions of an item in a materials handling facility dependent on corresponding spatial dimensions of each one of two or more separate dimensionally-constrained environments in which the item has been handled in temporal succession, wherein:
each of the two or more separate dimensionally-constrained environments comprises a container or other apparatus in or upon which the item was received, stored, packed, shipped or conveyed, or a portal or path through or upon which the item was conveyed; and
the item was handled in each of the two or more dimensionally-constrained environments in temporal succession, either individually or together with one or more other items; and
presenting instructions to pick an instance of the item from an inventory area in the facility, wherein said presenting comprises presenting instructions indicating a relative size of one of the estimated spatial dimensions of the item compared to a corresponding spatial dimension of one or more other items in the inventory area.

17. The non-transitory, computer-readable storage medium of claim 16,
wherein the item is handled individually in each of the two or more separate dimensionally-constrained environments in temporal succession; and
wherein said estimating comprises assigning the value for each given spatial dimension of the one or more spatial dimensions of the item based on a known or estimated measurement of a smallest one of the spatial dimensions of the two or more separate dimensionally-constrained environments that correspond to the given spatial dimension of the item.

18. The non-transitory, computer-readable storage medium of claim 16, wherein said estimating comprises calculating an estimated size envelope into which the item will fit, dependent on the estimated dimensions of the item.

19. The non-transitory, computer-readable storage medium of claim 16,
wherein the item is handled together with one or more other items in at least one of the two or more dimensionally-constrained environments; and
wherein said calculating an estimated size envelope into which the item will fit is further dependent on known or estimated dimensions of the one or more other items.

20. The non-transitory, computer-readable storage medium of claim 16, wherein when executed on the one or more computers, the program instructions further cause the one or more computers to perform:
selecting a container in which to pack an instance of the item and one or more other items for shipping, wherein said selecting comprises selecting a container large enough to hold an item having the estimated dimensions of the item and the one or more other items.

* * * * *